US012183169B2

(12) United States Patent
Rucker

(10) Patent No.: US 12,183,169 B2
(45) Date of Patent: *Dec. 31, 2024

(54) GAMING MACHINE AND METHODS OF ALLOWING A PLAYER TO PLAY GAMING MACHINES HAVING REPLACEABLE REELS

(71) Applicant: Konami Gaming, Inc., Las Vegas, NV (US)

(72) Inventor: Keith Rucker, Las Vegas, NV (US)

(73) Assignee: Konami Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/131,750

(22) Filed: Apr. 6, 2023

(65) Prior Publication Data

US 2023/0377426 A1 Nov. 23, 2023

Related U.S. Application Data

(63) Continuation of application No. 17/024,548, filed on Sep. 17, 2020, now Pat. No. 11,651,661, which is a continuation of application No. 14/836,843, filed on Aug. 26, 2015, now Pat. No. 10,810,844.

(30) Foreign Application Priority Data

Sep. 12, 2014 (AU) ................................ 2014224114

(51) Int. Cl.
*G07F 17/34* (2006.01)
*G07F 17/32* (2006.01)

(52) U.S. Cl.
CPC ............ *G07F 17/34* (2013.01); *G07F 17/326* (2013.01)

(58) Field of Classification Search
CPC ..... G07F 17/34; G07F 17/326; G07F 17/3267
See application file for complete search history.

(56) References Cited

U.S. PATENT DOCUMENTS 7,014,559 B1 3/2006 Fong
8,007,359 B2 8/2011 Yoshizawa
9,600,979 B2 * 3/2017 Hornik ................ G07F 17/3244
2003/0045345 A1 3/2003 Berman
2006/0058097 A1 3/2006 Berman et al.
2007/0060256 A1 3/2007 Yoshimura

* cited by examiner

*Primary Examiner* — David L Lewis
*Assistant Examiner* — Robert E Mosser
(74) *Attorney, Agent, or Firm* — Howard & Howard Attorneys PLLC

(57) ABSTRACT

A gaming device for providing an award to a player is described. The gaming device includes a controller that is configured to display a game including a plurality of reels being displayed within a grid. Each of the plurality of reels includes a plurality of symbol positions that are each being displayed with a corresponding symbol. The controller randomly generates a first outcome and spins and stops the plurality of reels to display the first outcome. The controller also detects a triggering condition and responsively selects a reel and replaces the selected reel with a replacement reel. The replacement reel includes a number of symbol positions being displayed in the grid that is less than a number of symbol positions included with the selected reel. The controller randomly generates a second outcome, spins and stops the plurality of reels including the replacement reel.

20 Claims, 15 Drawing Sheets

GAMING MACHINE AND METHODS OF ALLOWING A PLAYER TO PLAY GAMING MACHINES HAVING REPLACEABLE REELS

CROSS-REFERENCE TO RELATED APPLICATION

This application is a continuation of U.S. patent application Ser. No. 17/024,548, filed Sep. 17, 2020, which is a continuation of U.S. patent application Ser. No. 14/836,843, filed Aug. 26, 2015 (now U.S. Pat. No. 10,810,844, issued Oct. 20, 2020), which claims priority to Australian Patent Application No. 2014224114, filed on Sep. 12, 2014, the disclosures of which are hereby incorporated by reference in their entirety.

COPYRIGHT NOTICE

The figures included herein contain material that is subject to copyright protection. The copyright owner has no objection to the facsimile reproduction by anyone of this patent document as it appears in the U.S. Patent and Trademark Office, patent file or records, but reserves all copyrights whatsoever in the subject matter presented herein.

TECHNICAL FIELD

The subject matter disclosed herein relates generally to gaming machines and more particularly, to an apparatus and method for allowing players to play gaming machines having replaceable reels.

BACKGROUND OF THE INVENTION

Gaming machines, such as slot machines, are a cornerstone of the gaming industry. At least some known gaming machines include a video display device to display a reel game that includes a plurality of reels, wherein each reel includes a plurality of symbols. During game play, the gaming machine accepts a wager from a player, the player selects one or more paylines, and the gaming machine spins the reels and sequentially stops each reel to display the generated combination of symbols on the reels. The gaming machine then awards the player an award based on the combination of symbols orientated along the selected payline.

At least some known gaming machines display bonus games that include additional free spins, wild symbols, and/or increased award values. However, these known bonus games do not increase the probability of achieving a winning outcome and do not provide the players with a visual indication that the probability of winning has been increased. Over time, the player may become frustrated with known bonus games because of the probability of achieving an award may not be improved and/or the player is not aware that the probability of winning has increased. Accordingly, new features are necessary to appeal to player interest and enhance excitement in order to entice longer play and increased profitability. The present invention is directed to satisfying these needs.

SUMMARY OF THE INVENTION

In one aspect of the present invention, a gaming device for providing an award to a player is provided. The gaming device includes a display device, a user input device configured to generate a signal indicative of a player's selection input, and a controller that is coupled to the display device and the user input device. The controller is configured to display a game on the display device including a plurality of reels being displayed within a grid. Each of the plurality of reels includes a plurality of symbol positions that are each being displayed with a corresponding symbol. The controller randomly generates a first outcome and spins and stops the plurality of reels to display the first outcome. The controller also detects a triggering condition with the first outcome and responsively selects at least one reel of the plurality of reels and replaces the selected reel with a replacement reel. The replacement reel includes a number of symbol positions being displayed in the grid that is less than a number of symbol positions included with the selected reel. The controller randomly generates a second outcome, spins and stops the plurality of reels including the replacement reel to display the second outcome, and provides an award to the player as a function of the second outcome.

In another aspect of the present invention, a method of providing an award to a player is provided. The method includes receiving a wager from a player and responsively displaying a game on a display device. The game includes a plurality of reels being displayed within a grid. Each of the reels includes a plurality of symbol positions each being displayed with a corresponding symbol. The method includes randomly generating a first outcome and spinning and stopping the plurality of reels to display the first outcome. The method also includes detecting a triggering condition with the first outcome and responsively selecting at least one reel of the plurality of reels and replacing the selected reel with a replacement reel. The selected reel includes a first number of symbol positions. The replacement reel includes a number of symbol positions being displayed in the grid that is less than a number of symbol positions included with the selected reel. The method includes randomly generating a second outcome, spinning and stopping the plurality of reels including the replacement reel to display the second outcome, and providing an award to the player as a function of the second outcome.

In yet another aspect of the present invention, one or more non-transitory computer-readable storage media, having computer-executable instructions embodied thereon, is provided. The computer-executable instructions cause a processor to display a game on a display device including a plurality of reels being displayed within a grid. Each of the plurality of reels includes a plurality of symbol positions being displayed with a corresponding symbol. The processor randomly generates a first outcome and spins and stops the plurality of reels to display the first outcome. The processor detects a triggering condition with the first outcome and responsively selects at least one reel of the plurality of reels and replaces the selected reel with a replacement reel. The replacement reel includes a number of symbol positions being displayed in the grid that is less than a number of symbol positions included with the selected reel. The processor randomly generates a second outcome, spins and stops the plurality of reels including the replacement reel to display the second outcome, and provides an award to the player as a function of the second outcome.

BRIEF DESCRIPTION OF THE DRAWINGS

Other advantages of the present invention will be readily appreciated as the same becomes better understood by reference to the following detailed description when considered in connection with the accompanying drawings wherein.

Corresponding reference characters indicate corresponding parts throughout the drawings.

DETAILED DESCRIPTION OF THE PREFERRED EMBODIMENT

With reference to the drawings and in operation, the present invention overcomes at least some of the disadvantages of known gaming machines by providing a gaming device that displays a game including a bonus feature event that includes a replacement reel. More specifically, the gaming device displays a game including a plurality of reels, detects a triggering condition in a game outcome, replaces one or more of the reels with the replacement reel that displays fewer symbols than the selected reels, and provides an award based on an outcome that includes the replacement reel. By providing a replacement reel that displays fewer game symbols, the probability of achieving a winning outcome is increased, the player's expectation for achieving a win is increased, and the enjoyment of the game is improved. Thus, the amount of time that the game is played by patrons of a gaming establishment is thereby increased.

Figure 7:
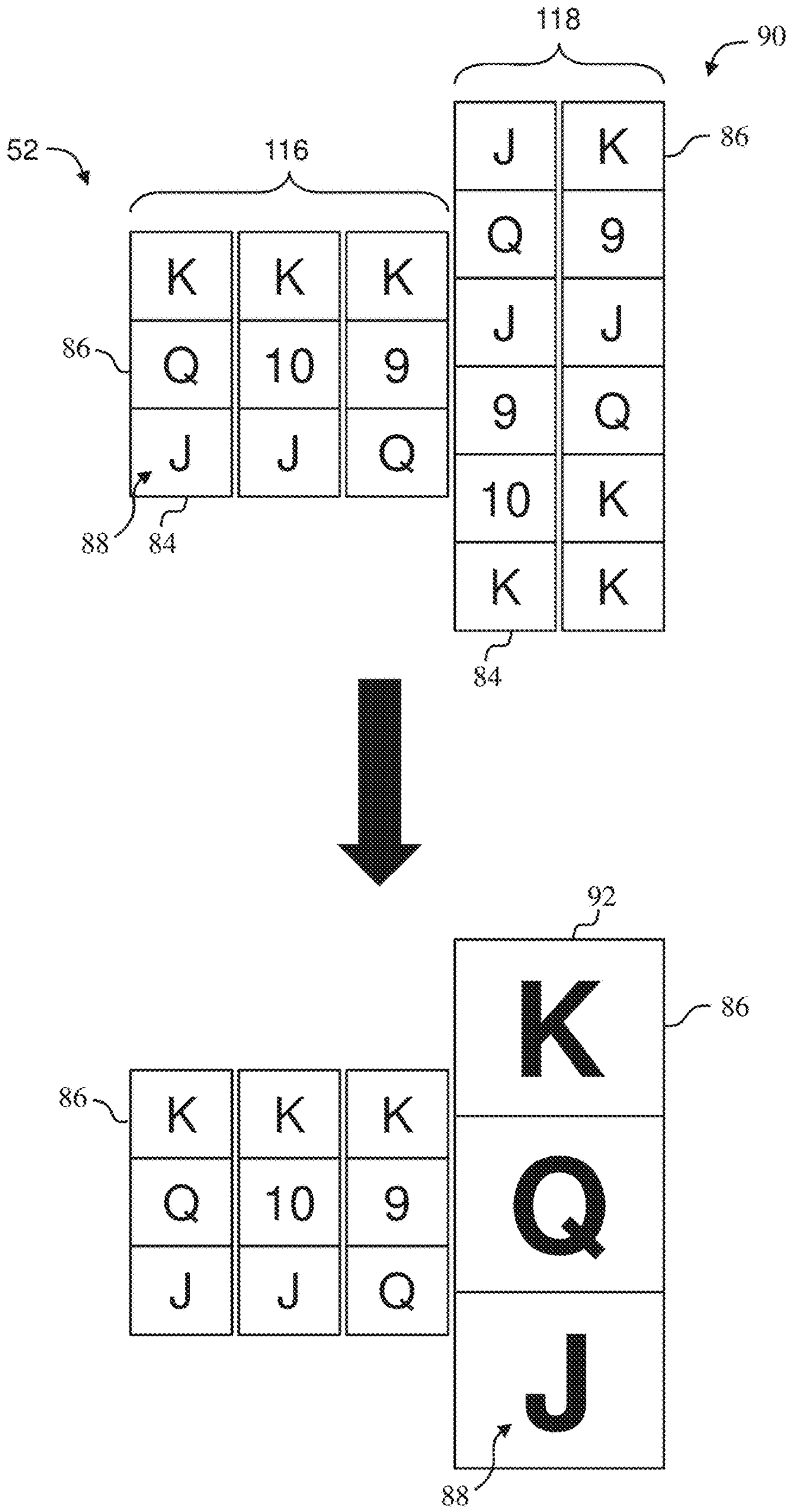
FIGS. 7-14 are series of graphical displays of the slot game shown in FIGS. 4-6, according to an embodiment of the present invention.

In general, the present invention includes a gaming device 10 that is configured to Provide a base game that includes a plurality of reels displayed with 3-3-3-6-6 symbol arrangement and includes a bonus feature event that replaces one or more reels with a replacement reel that displays fewer symbols in the symbol arrangement. The gaming device 10 evaluates wins from the left most reel to the right in any positions on adjacent reels. In one embodiment, during the bonus feature event, the gaming device 10 may fuse Reel 4 and Reel 5 together to visually show as 1 reel with 3 large positions (a "3-3-3-3" arrangement shown in FIGS. 5 and 7). In addition, the gaming device 10 may fuse Reel 1, Reel 2 and Reel 3 together to visually show as 1 reel with 1 large position (a "1-6-6" symbol arrangement shown in FIG. 9). In addition, in one embodiment, the gaming device 10 may fuse Reel 1, Reel 2, and Reel 3 together to visually show as 1 reel with 1 large positions and fuse Reel 4 and Reel 5 together to visually show as 1 reel with 3 large positions (a "1-3" symbol arrangement shown in FIG. 10)

Primary Game Rules: In one embodiment, the game may include symbols such as SCATTER, WILD, PIC-A, PIC-B, PIC-C, PIC-D, A, K, Q, J, 10 and 9. WILD substitutes for PIC-A, PIC-B, PIC-C, PIC-D, A, K, Q, J and 10. Each reel contains a number of adjacent special positions that may be randomly replaced with one of the following symbols: WILD, PIC-A, PIC-B, PIC-C, PIC-D, A, K, Q, J, and 10. All the symbols have the possibility to appear on every reel. The wins are on adjacent reels from left to right, starting with the leftmost reel. 3, 4, and 5 SCATTER awards 8, 15, and 50 free games respectively.

Bonus Feature Event Rules: In one embodiment, the bonus feature event may be triggered by mystery and is chosen before the start of the game. Once triggered, Reel 4 and Reel 5 fuse together to visually show as 1 reel with 3 large positions. Reels 4 and 5 will visually be shown as 1 giant reel that shows 3 giant symbols in the window. Then Reel 1 will synchronize with the new large Reel. Each symbol in the Giant position will be placed into the 4 corresponding primary positions after the reels have stopped. Reel 1 and the new Giant Reel 4 will display the same symbols.

During the bonus feature event, the gaming device 10 may generate 3 random numbers that will determine what reel positions will appear on Reel 1, Reel 2 and Reel 3. The top 2 positions on Reel 4 and Reel 5 will display the symbol that appears at the top position on Reel 1. The middle 2 positions on Reel 4 and Reel 5 will display the symbol that appears at the middle position on Reel 1. The bottom 2 positions on Reel 4 and Reel 5 will display the symbol that appears at the bottom position on Reel 1.

In one embodiment, Reel 1, Reel 4 and Reel 5 will spin and stop at the same time, while showing exactly the sequence of symbols as it spins and stops. No Giant symbols are used. In another embodiment, current Reel 4 and Reel 5 will be replaced with a new Giant reel. The top position on the new Giant reel will occupy the same space as the top 2 positions on both Reel 4 and Reel 5. The middle position on the new Giant reel will occupy the same space as the middle 2 positions on both Reel 4 and Reel 5. The bottom position on the new Giant reel will occupy the same space as the bottom 2 positions on both Reel 4 and Reel 5. Reel 1 and the new Giant reel will spin and stop at the same time, while showing exactly the sequence of symbols as it spins and stops. Each Giant symbol will transform into 4 smaller symbols that will be placed in the corresponding positions on the previous Reel 4 and Reel 5.

A selected embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Figure 1:
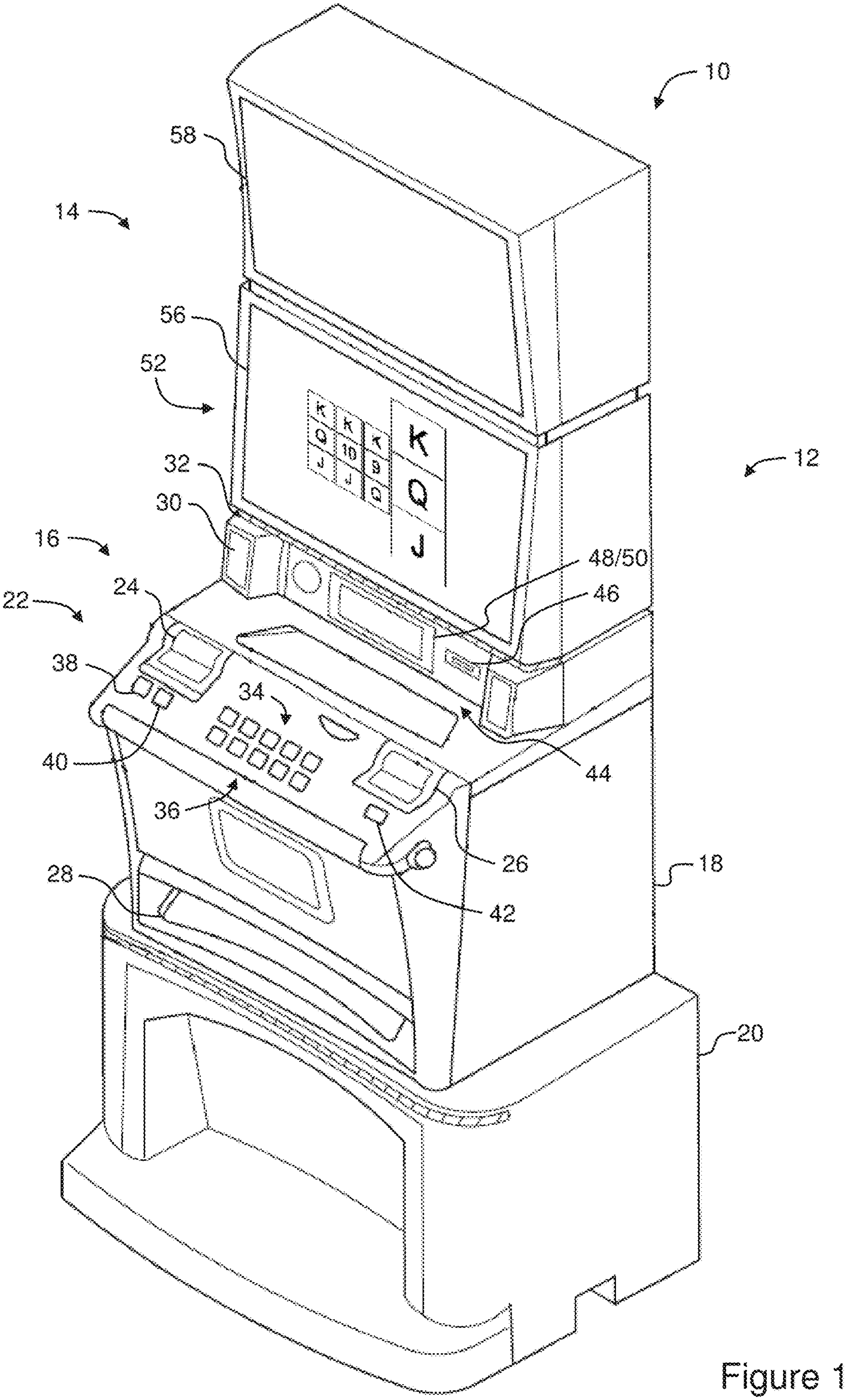
FIG. 1 is a perspective view of an exemplary device for use in providing an award to a player, according to an embodiment of the present invention.
Figure 2:
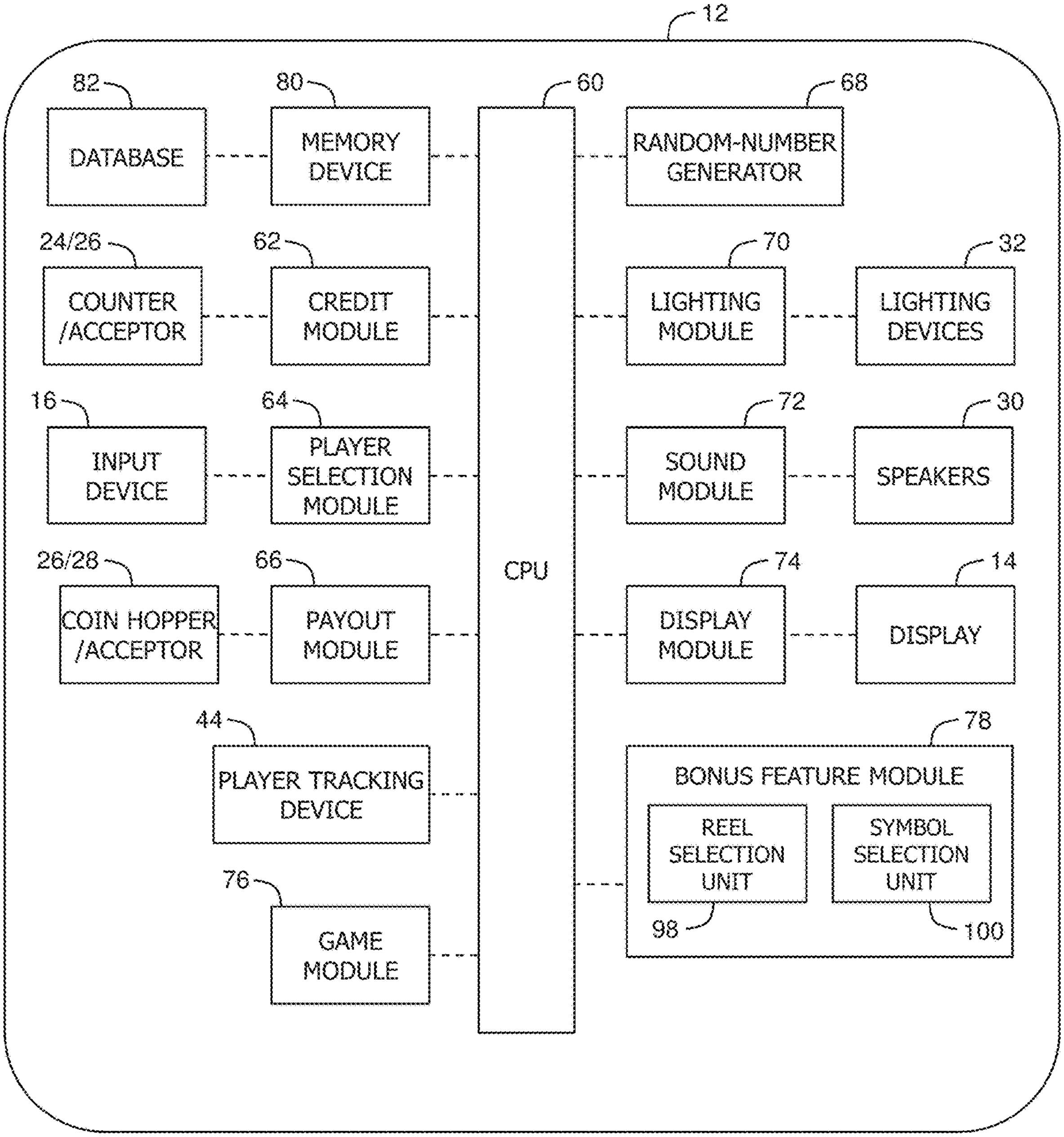
FIG. 2 is a schematic representation of a gaming controller that may be used with the gaming device shown in FIG. 1, according to an embodiment of the present invention.

FIG. 1 is a perspective view of an exemplary gaming device 10 for providing an award to a player, according to an embodiment of the present invention. FIG. 2 is a schematic representation of a gaming controller 12 that may be used with the gaming device 10. In the illustrated embodiment, the gaming device 10 includes a display device 14 for displaying a plurality of games, a user input device 16 to enable a player to interface with the gaming device 10, and a gaming controller 12 that is operatively coupled to the display device 14 and the user input device 16 to enable a player to play games being displayed on the display device 14. In one embodiment, the gaming device 10 may include a gaming machine installed in a casino. In another embodiment, the gaming device 10 may include a personal computer, laptop, cell phone, smartphone, tablet computer, personal data assistant, and/or any suitable computing device.

In the illustrated embodiment, the gaming device 10 also includes a cabinet assembly 18 that is configured to support the display device 14, the user input device 16, and/or the gaming controller 12 from a gaming stand 20 and/or a supporting surface. The display device 14 and the user input device 16 are each coupled to the cabinet assembly 18 and are each accessible by the player. In one embodiment, the gaming controller 12 is positioned within the cabinet assembly 18. Alternatively, the gaming controller 12 may be separated from the cabinet assembly 18, and connected to components of the gaming device 10 through a network such as, for example, a LAN, a WAN, dial-in-connections, cable modems, wireless modems, and/or special high-speed ISDN lines. For example, in one embodiment, the gaming controller 12 may be located remotely with respect to the gaming device 10, or within one of the gaming device cabinet assembly 18.

The user input device 16 includes a plurality of input buttons 22, a coin slot 24, and/or a bill acceptor 26. The coin slot 24 includes an opening that is configured to receive coins and/or tokens deposited by the player into the gaming device 10. The gaming controller 12 converts a value of the coins and/or tokens to a corresponding amount of gaming credits that are used by the player to wager on games played on the gaming device 10.

The bill acceptor 26 includes an input and output device that is configured to accept a bill, a ticket, and/or a cash card into the bill acceptor 26 to enable an amount of gaming credits associated with a monetary value of the bills, ticket, and/or cash card to be credited to the gaming device 10. Moreover, the gaming device 10 may also utilize a cashless wagering system (not shown), such as a ticket in ticket out (TITO) system (not shown). In one embodiment, the bill acceptor 26 also includes a printer (not shown) that is configured to dispense a printed voucher ticket that includes information indicative of an amount of credits and/or money paid out to the player by the gaming device 10 during a gaming session. The voucher ticket may be used at other gaming devices, or redeemed for cash, and/or other items as part of a casino cashless system (not shown).

A coin hopper 28 is coupled to the cabinet assembly 18 and is configured to receive a plurality of coins that are dispensed from the gaming device 10. One or more speakers 30 are installed inside the cabinet assembly 18 to generate voice announcements and/or sound effects associated with game play. The gaming device 10 also includes one or more lighting devices 32 that are configured to blink and/or change brightness and color in specific patterns to produce lighting effects to enhance a visual gaming experience for the player.

In one embodiment, the input buttons 22 include a plurality of BET switches 34 for inputting a wager on a game, a plurality of selection switches 36 for selecting a betting line, a payline, and/or card, a MAXBET switch 38 for inputting a maximum wager, a PAYOUT switch 40 for ending a gaming session and dispensing accumulated gaming credits to the player, and a start switch, i.e., a SPIN/DEAL button 42 to initiate an output of a game.

In the illustrated embodiment, the BET switches 34 include five switches from 1BET to 5BET to enable a player to wager between a minimum bet up to 5×minimum bet. Each selection switch 36 corresponds to a betting line such as, for example, a payline and/or symbol for a reel game, one or more cards for a card game, and/or a symbol for a roulette game, to enable a player to associate a wager with one or more betting lines. The MAXBET switch 38 enables a player to input the maximum bet that a player can spend against one play of a game. The PAYOUT switch 40 enables a player to receive the amount of money and/or credits awarded to the player during a gaming session, which has been credited onto the gaming device 10.

The gaming device 10 also includes a player tracking device 44 that is coupled to the gaming controller 12 for identifying the player and/or a player tracking account that is associated with the player. The player tracking account may include, but is not limited to, gaming credits available to the player for use in playing the gaming device 10. The player tracking device 44 is configured to communicate player account information between a player tracking controller (not shown) and the gaming device 10. For example, the player tracking device 44 may be used to track bonus points and/or credits awarded to the player during a gaming session and/or track bonus and/or credits downloaded to the gaming device 10 from the player tracking system. In the illustrated embodiment, the player tracking controller assigns a player status, e.g. a player ranking, based on the player account information. For example, the player tracking information may include, but is not limited to, a frequency in which the player plays a game, the average wager the player makes per play of a game, a total amount wagered by the player over a predefined period of time, and/or any other suitable player tracking information.

The player tracking device 44 is coupled to the gaming cabinet assembly 18 and includes a player identification card reader 46, a data display 48, and a keypad 50. The player identification card reader 46 is configured to accept a player tracking card (not shown) inserted by the player, and read information contained on the player tracking card to identify the player account information. The player identification card reader 46 may include, but is not limited to, a barcode reader, a magnetic card reader, and/or a radio frequency identification (RFID) card reader. The keypad 50 is configured to accept a user selection input such as, for example, a unique player personal identification number (PIN) to facilitate enabling the gaming device 10 to identify the player, and access player account information associated with the identified player to be displayed on the data display 48. In one embodiment, the data display 48 includes a touchscreen panel that includes the keypad 50. Alternatively, the data display 48 and the keypad 50 may be included in the display device 14.

In the illustrated embodiment, the display device 14 is configured to display a game 52 on a game screen 54 (shown in FIGS. 4-14) including indicia and/or symbols for use in the game 52, e.g., cards used by a card game, roulette wheel and symbols used in a roulette game, reels used in a reel game and/or any suitable symbols and images for use in displaying a game. The game 52 may include any type of game including, but not limited to, a role-playing game, a puzzle game, a maze-type game, a video slot game, a keno game, a blackjack game, a video poker game, or any type of game which allows a player to make a wager, play a game, and potentially provide the player an award based on an outcome of the game and a paytable. In one embodiment, the display device 14 may include a first display 56 and a second display 58. Moreover, each display 56 and 58 may be configured to display at least a portion of the game screen 54 and/or game play instructions. In one embodiment, the first display 56, and/or the second display 58 may include a flat panel display, such as a cathode ray tube display (CRT), a liquid crystal display (LCD), a light-emitting diode display (LED), an organic light-emitting diode display (OLED), an active-matrix organic light-emitting diode display (AMOLED), a plasma display, and/or any suitable visual output device capable of displaying graphical data and/or text to a user. Alternatively, a single component, such as a touch screen, may function as both the display device 14 and as the user input device 16. In an alternative embodiment, the first display 56 and/or the second display 58 may include a plurality of mechanical reels displaying a plurality of game symbols.

Referring to FIG. 2, in one embodiment, the gaming controller 12 may include a processor, i.e., a central processing unit (CPU) 60, a credit module 62, a player selection module 64, a payout module 66, a random-number generator (RNG) 68, a lighting module 70, a sound module 72, a display module 74, a game module 76, a bonus feature module 78, a memory device 80, and a database 82. The memory device 80 includes a computer readable medium, such as, without limitation, random access memory (RAM), read-only memory (ROM), erasable programmable read-only memory (EPROM), flash memory, a hard disk drive, a solid state drive, a diskette, a flash drive, a compact disc, a digital video disc, and/or any suitable device that enables the CPU 60 to store, retrieve, and/or execute instructions and/or data.

The CPU 60 executes various programs, and thereby controls other components of the gaming controller 12 according to player instructions and data accepted by the user input device 16. The CPU 60 in particular executes a game program, and thereby conducts a game in accordance with the embodiments described herein. The memory device 80 stores programs and databases used by the CPU 60. Moreover, the memory device 80 stores and retrieves information in the database 82 including, but not limited to, wagers, wager amounts, average wagers per game, a game type, awards, type of awards, a number of reels associated with a game, a number of symbols being displayed on each reel, replacement reels, image data for producing game images and/or screens on the display device 14, and temporarily stores variables, parameters, and the like that are used by the CPU 60. In addition, the memory device 80 stores indicia, symbol weights, symbol values, paytables, and/or winning combination tables which represent relationships between combinations of random numbers and types of awards. In one embodiment, the memory device 80 utilizes RAM to temporarily store programs and data necessary for the progress of the game, and EPROM to store, in advance, programs and data for controlling basic operation of the gaming device 10, such as the booting operation thereof.

The credit module 62 manages the amount of player's credits, which is equivalent to the amount of coins and bills counted and validated by the bill acceptor 26. The player selection module 64 monitors player selections received through the user input device 16, and accepts various instructions and data that a player enters through the user input device 16. The payout module 66 converts a player's credits to coins, bills, or other monetary data by using the coin hopper 28 and/or for use in dispensing a credit voucher via the bill acceptor 26.

The lighting module 70 controls one or more lighting devices 32 to blink and/or change brightness and color in specific patterns in order to produce lighting effects associated with game play. The sound module 72 controls the speakers 30 to output voice announcements and sound effects during game play.

The display module 74 controls the display device 14 to display various images on a graphical interface including the game screen 54 preferably by using computer graphics and image data stored in the memory device 80. More specifically, the display module 74 controls video reels being displayed with the game 52 and game symbols and images being displayed in the game screen 54 being displayed on the first display 56 and/or the second display 58 by using computer graphics and the image data. In another embodiment, the display device 14 includes a plurality of mechanical reels. The display module 74 may be configured to control a rotation of each of the plurality of mechanical reels to spin and stop each reel to display a game outcome.

The RNG 68 generates and outputs random numbers to the CPU 60 preferably at the start of each round of a game. The CPU 60 uses the random numbers to determine an outcome of the games. For example, if the game is a video slot game, the CPU 60 uses the RNG 68 to randomly select an arrangement of symbols to be displayed on video reels. Moreover, the CPU 60 generally uses random numbers generated by the RNG 68 to play the games and to determine whether or not to provide an award to a player. In one embodiment, the CPU 60 may also use the random numbers to determine a stop position of each reel for use in stopping each of a plurality of mechanical reels and/or video reels being displayed in the display device 14 to display the game outcome. The CPU 60 may also receive combinations of random numbers from the RNG 68 and compare the generated combinations with winning combinations stored in the winning combination table to determine if the generated outcome is a winning outcome that is associated with a type of award. In general, the term "award" may be a payout, in terms of credits or money. Thus, the CPU 60 may award a regular payout in response to the outcome of the game 52. However, it should be noted that the term award may also refer to other types of awards, including, prizes, e.g., meals, show tickets, etc . . . , as well as in-game award, such as bonus features, free games, and/or free spins, or awarding the player one or more wild symbols or stacked wild symbols in each of the games.

The game module 76 includes a game program for use in executing the game 52 being displayed on the display device 14. In the illustrated embodiment, the game 52 is a video slot game. However, it should be noted that the game 52 may be any type of game upon which a player could make a wager including, but not limited to a keno game, a blackjack game, a video poker game, or any type of game that enables the gaming controller 12 to function as described herein. During play of the game 52, the game module 76 retrieves image data from the database 82 and displays the game 52 on the game screen 54. In the illustrated embodiment, the game module 76 displays the game 52 including a plurality of reels 84. Each of the reels 84 includes a plurality of symbol positions 86 that are each displayed with a game symbol 88. The game module 76 receives one or more wagers from the player via the user input device 16, responsively generates and outcome of the game 52, determines if the game outcome is a winning outcome, and provides an award to the player, if any, as a function of game outcome and the wager. Moreover, the game module 76 receives one or more random numbers from the RNG 68, determines an outcome of the game 52 as a function of the received random numbers, and spins and stops the reels 84 to display the outcome of the game 52 on the display device 14.

The bonus feature module 78 includes a game program for use in executing a bonus feature event 90 (shown in FIG. 5) during the game 52. In the illustrated embodiment, the bonus feature module 78 is configured to display the bonus feature event 90 including selecting one or more reels 84 being displayed with the game 52 and replacing the selected reels 84 with a replacement reel 92, and generating another game outcome including the replacement reel 92. In one embodiment, the replacement reel 92 includes a number of symbol positions 86 that is less than the number of symbol positions 86 being displayed in the selected reels 84. Thus reducing the amount of game symbols 88 being displayed during the bonus feature event 90 and increasing the probability of achieving a winning outcome. In addition, the bonus feature module 78 may also split the replacement reel 92 into two or more secondary replacement reels 94 (shown in FIG. 6) that include groups of symbol positions that display the same symbols that were displayed with the replacement reel 92. For example, in one embodiment, during the bonus feature event 90, the bonus feature module 78 may select a set of reels 84 displayed during a first outcome of the game 52, replace the set of reels 84 with the replacement reel 92, randomly generate a second outcome including the replacement reel 92, and spin and stop the reels 84 to display the outcome. The bonus feature module 78 may also split the replacement reel 92 into a plurality of secondary replacement reels 94, and determine a third outcome of the game 52 as a function of the secondary replacement reels 94 and provide an award to the player based on the third game outcome. Each of the secondary replacement reels 94 may include one or more groups 96 of symbol positions 86 that each correspond to one of the symbol positions 86 displayed with the replacement reel 92 such that each symbol position 86 in a group displays the same symbol 88 that was displayed in the corresponding symbol position 86 of the replacement reel 92.

In the illustrated embodiment, the bonus feature module 78 detects a triggering condition occurring with the game 52 and initiates the bonus feature event 90 in response to detecting the triggering condition. In one embodiment, the triggering condition may be a mystery trigger condition that may occur after any bought game and/or any game outcome initiated based on a wager received from the player. For example, in one embodiment, the gaming controller 12 may randomly select a bonus event number from a predefined range of numbers. Upon receiving a wager from the player, the gaming controller 12 may also randomly select a primary game number from the predefined range of numbers and initiate the bonus feature event if the primary game number matches the bonus event number. At the completion of the bonus feature event, the gaming controller 12 randomly selects another bonus event number from the predefined set of numbers for use in initiating a subsequent bonus feature event. If the primary game number does not match the bonus event number, the gaming controller 12 randomly selects another primary game number when another wager is received from the player. In another embodiment, the gaming controller 12 may detect the triggering condition based on the appearance of one or more predefined game symbols, for example a scatter symbol, and/or a predefined combination of game symbols appearing in one or more game outcomes. In addition, the triggering condition may be detected as a function of the amount of a current wager, a cumulative amount of wagers placed by the player, a level of play, player ranking, and/or any suitable triggering condition that enables the gaming controller 12 to function as described herein.

In the illustrated embodiment, the bonus feature module 78 includes a reel selection unit 98 and a symbol selection unit 100. During the bonus feature event 90, the reel selection unit 98 selects one or more reels 84 to be replaced by the replacement reel 92. Moreover, the reel selection unit 98 may select one or more sets of reels 84 that are replaced by one or more replacement reels 92. In one embodiment, the reel selection unit 98 receives a random number from the RNG 68 and randomly selects the reels 84 and/or reel sets as a function of the received random number. In another embodiment, the reel selection unit 98 may select a predefined reel and/or a predefined set of reels to be replaced by the replacement reel 92. In addition, the reel selection unit 98 may also select the number of secondary replacement reels 94 that are split from the replacement reel 92. In one embodiment, the reel selection unit 98 may select one or more reels 84 based on the appearance of a triggering symbol on the corresponding reel 84 in an outcome of the game 52.

The symbol selection unit 100 selects the number of symbol positions 86 being displayed with the replacement reel 92 and selects the game symbols 88 that are being displayed in each symbol position 86. For example, in one embodiment, the symbol selection unit 100 may determine the number of symbol positions 86 being displayed with the replacement reel 92 based on the number of symbol positions 86 being displayed in the selected reels 84. In another embodiment, the symbol selection unit 100 may randomly select the number of symbol positions 86 being displayed with the replacement reel 92. In one embodiment, the symbol selection unit 100 may select a second reel 84 and determine the number of symbol positions 86 being displayed with the replacement reel 92 based on the number of symbol positions 86 displayed with the selected second reel 84. In addition, the symbol selection unit 100 may determine the game symbols 88 being displayed with the second reel 84 including an order in which the game symbols 88 and being displayed, and display the same symbols 88 in corresponding symbol positions 86 of the replacement reel 92 to facilitate synchronizing a display of the selected second reel 84 and the replacement reel 92 during the bonus feature event 90.

The symbol selection unit 100 may also determine a number of symbol positions 86 being displayed on each secondary replacement reel 94 as a function of the number of symbol positions 86 being displayed on the replacement reel 92. In addition, the symbol selection unit 100 may also randomly select the number of symbol positions 86 being displayed with the secondary replacement reels 94.

In one embodiment, the replacement reel 92 may include at least one run 102 of consecutive special symbol positions 104 (shown in FIG. 11) that each include a similar game symbol 88. During the bonus feature event 90, the symbol selection unit 100 may randomly select a game symbol 88 from a predefined set of symbols, and display the selected game symbol 88 in each of the special symbol positions 104 such that each special symbol position 104 displays the selected game symbol 88. In one embodiment, the symbol selection unit 100 may select a plurality of similar symbols and/or a plurality of associated symbols such as, for example, a set of special symbols included in a category of special symbols, for display in each special symbol position 104. For example, the predefined set of game symbols may include, but is not limited to, a category of symbols such as, for example, shapes, colors, sounds, items, characters, backgrounds, frames, and/or any category of game symbols that enable the gaming controller 16 to function as described herein. Each symbol category includes a plurality of symbols having predefined characteristics associated with the symbol category. For example, the predefined set of symbols may include a shape category that includes a plurality of symbols that each have a shape associated with the shape category. The symbol selection unit 100 may select one or more symbols indicative of the shapes within the shape category, and display the selected symbols in each of the special symbol positions 104. Additional details of adjacent special symbol positions, which may be used in the present invention, are described in U.S. patent application Ser. No. 11/299,009 to Yoshimi, now U.S. Pat. No. 8,096,869, filed Dec. 9, 2005, titled "Gaming Machine with Runs of Consecutive Identical Symbols", which is incorporated herein by reference in its entirety.

Figure 3:
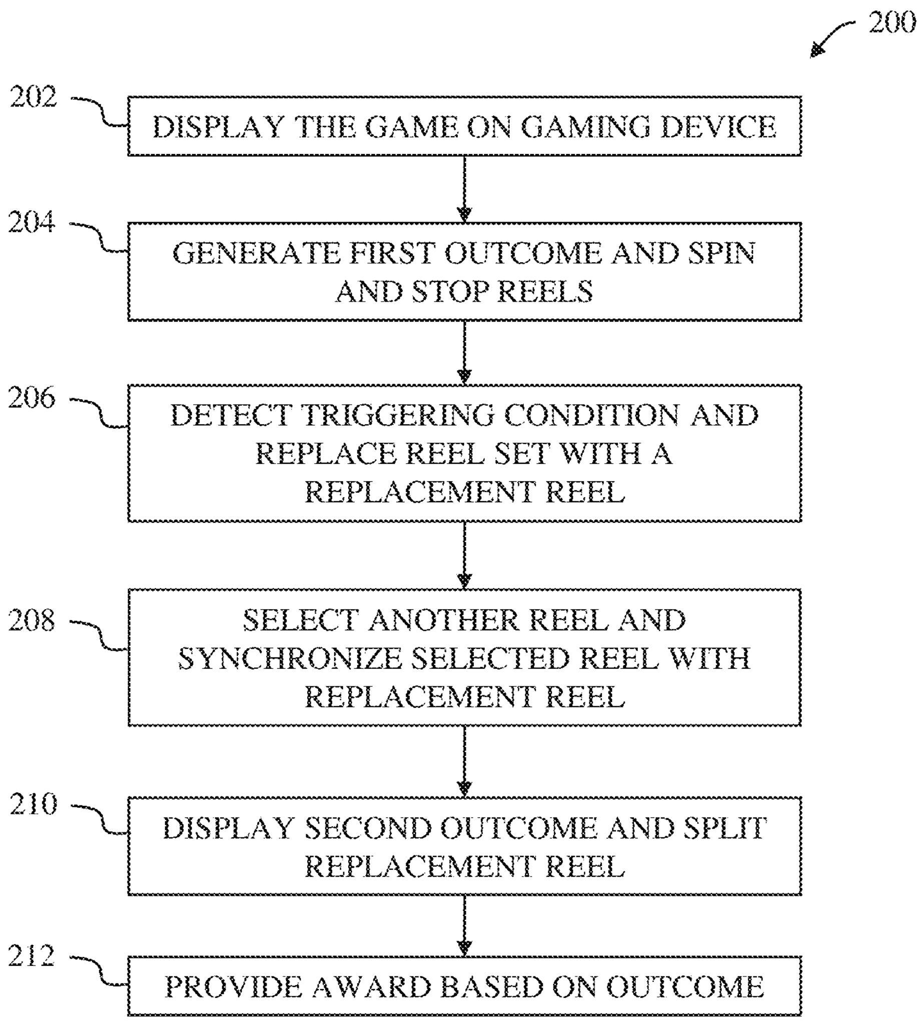
FIG. 3 is a flowchart of a method that may be used with the gaming device shown in FIG. 1 for providing an award to a player, according to an embodiment of the present invention.
Figure 4:
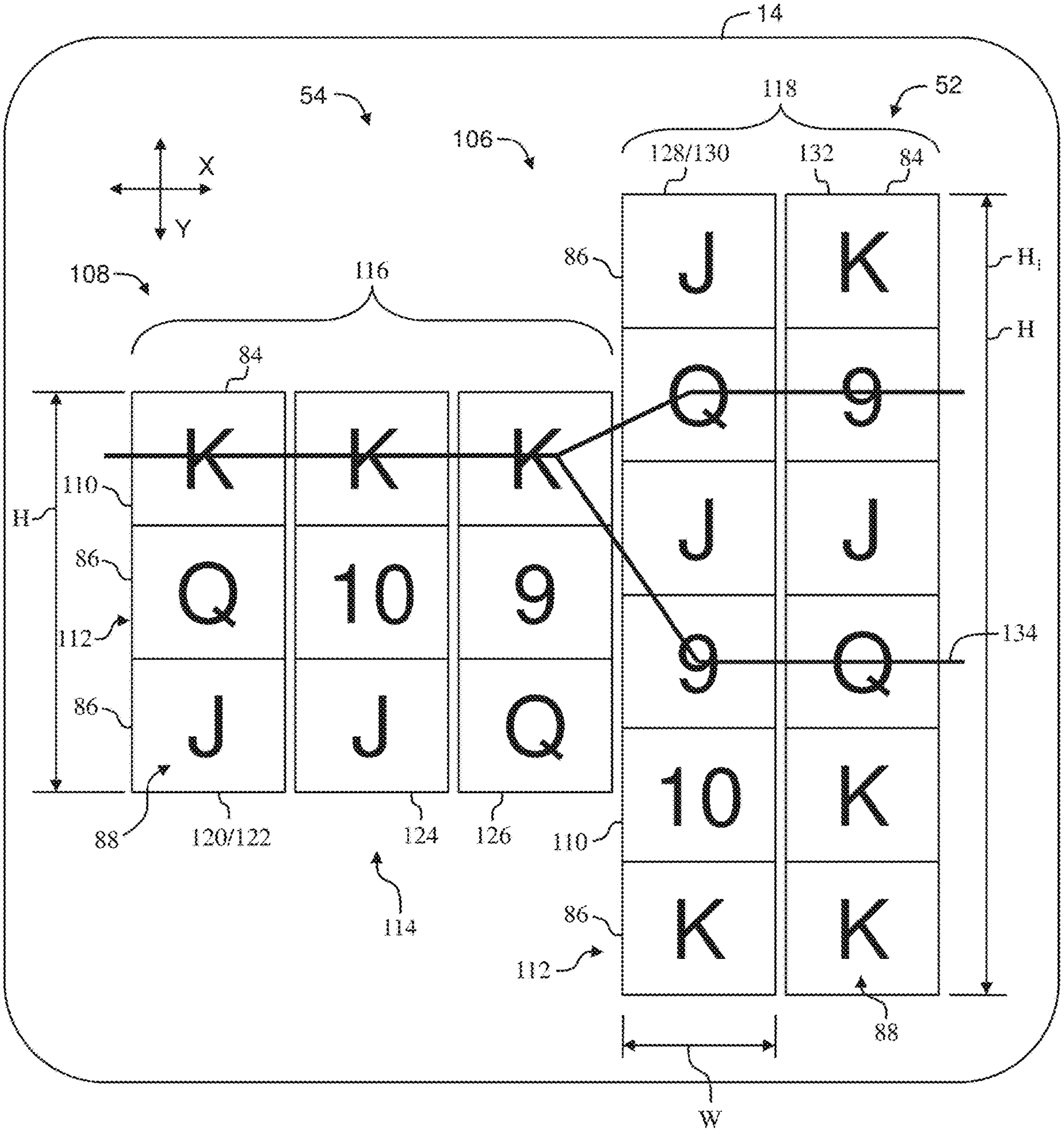
FIGS. 4-6 are exemplary entertaining graphical display of a game screen including a slot-type game that may be displayed on the gaming device shown in FIG. 1 during the method shown in FIG. 3, according to an embodiment of the present invention.
Figure 5:
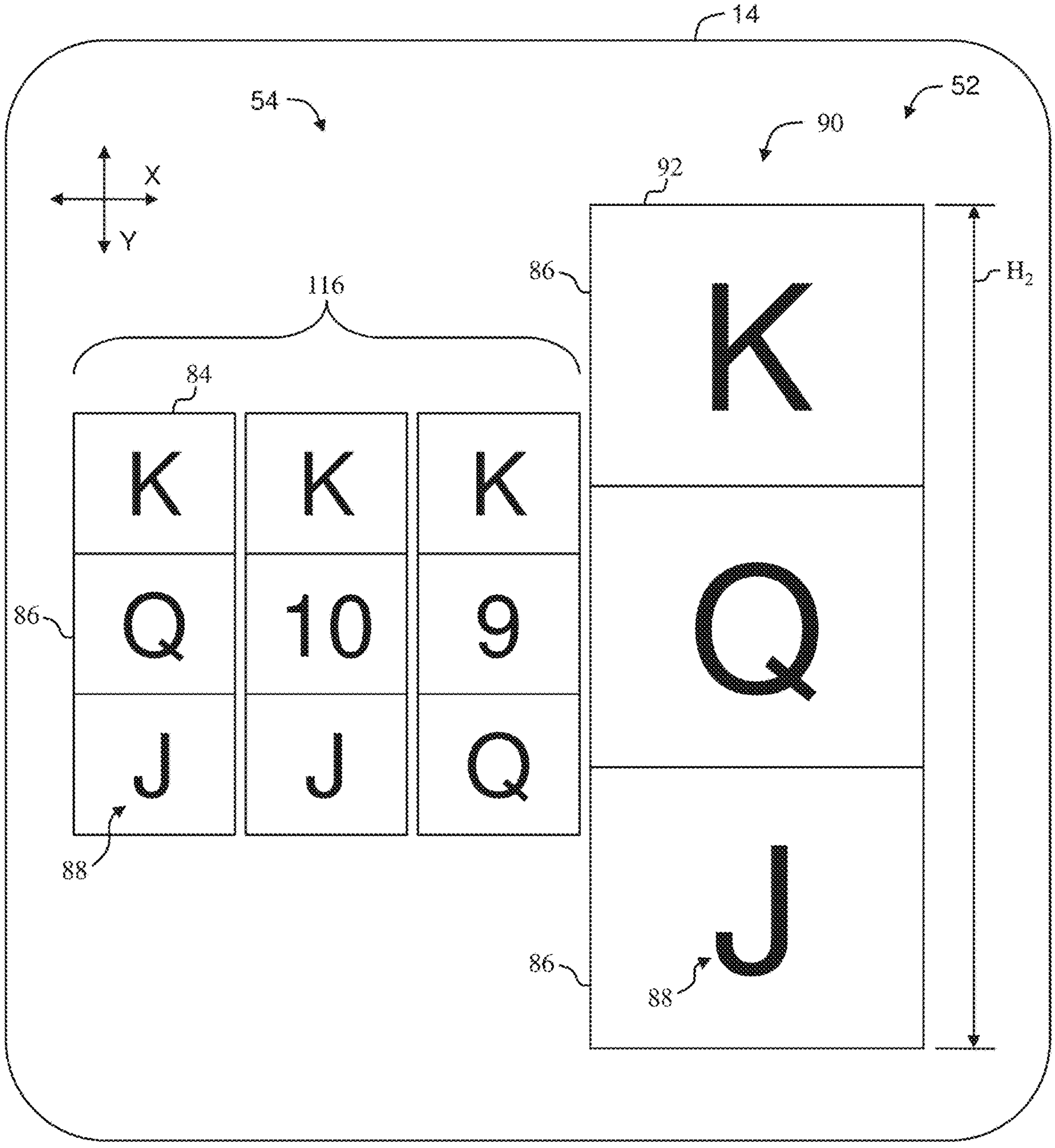
Figure 6:
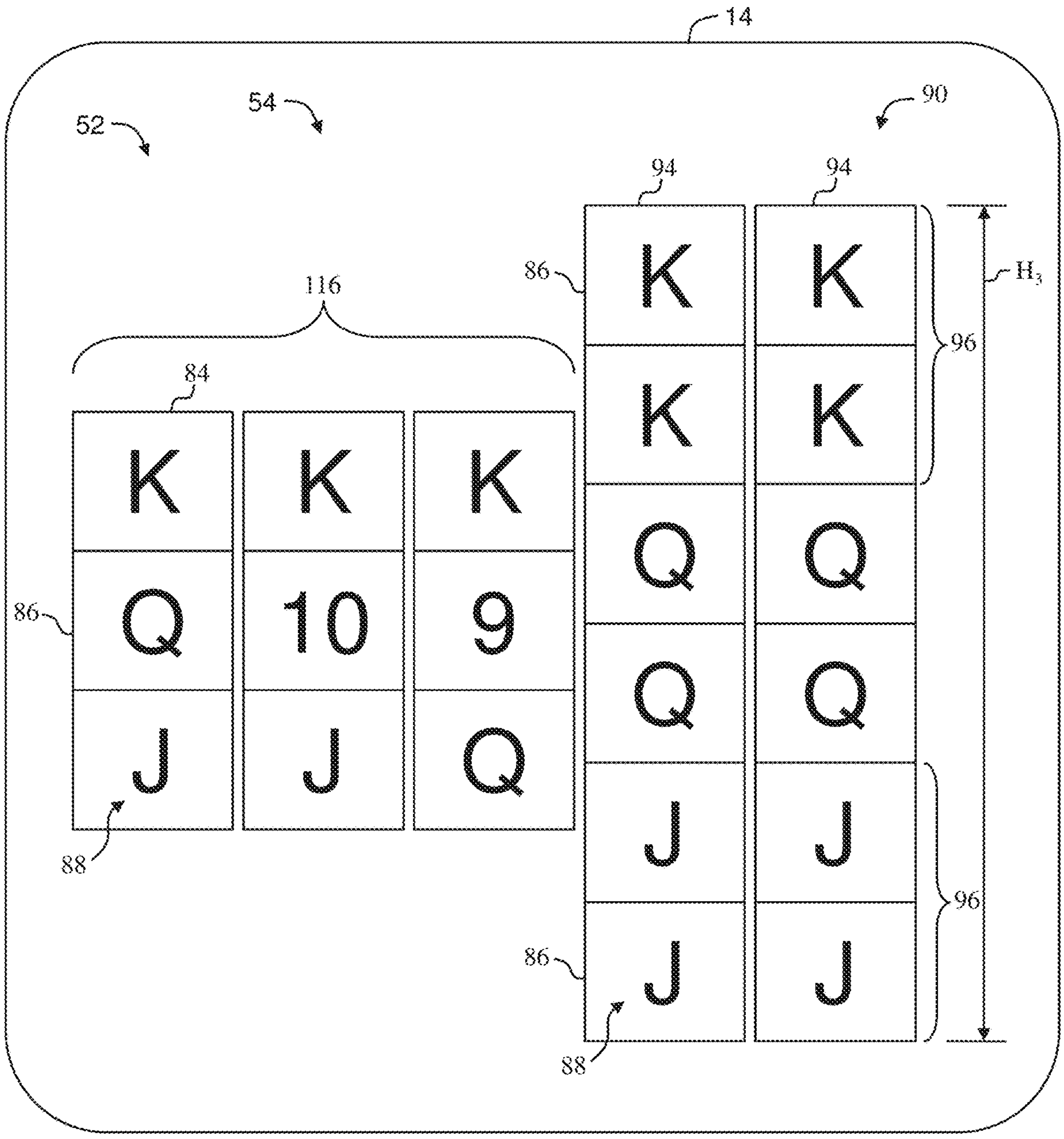

FIG. 3 is a flowchart of a method 200 that may be used with the gaming device 10 to provide an award to a player. The method 200 includes a plurality of steps. Each method step may be performed independently of, or in combination with, other method steps. Portions of the method 200 may be performed by any one of, or any combination of, the components of the one or more gaming devices 10. FIGS. 4-6 are exemplary entertaining graphical display of a game screen 54 including a slot-type game 52 that may be displayed on the gaming device 10 during the method 200, according to an embodiment of the present invention. FIGS. 7-14 are series of graphical displays of the slot game 52, according to embodiments of the present invention.

In the illustrated embodiment, in method step 202, the gaming controller 12 receives a signal indicative of a wager being received by the gaming device 10 and responsively displays the game 52 on the display device 14. In one embodiment, the game 52 is a video slot game. However, it should be noted that the game 52 may be any type of game upon which a player could make a wager including, but not limited to a keno game, a blackjack game, a video poker game, or any type of game that enables the gaming controller 12 to function as described herein. In addition, in one embodiment, the game 52 may include a slot game being displayed with a plurality of mechanical reels (not shown). In the illustrated embodiment, the gaming controller 12 displays the game 52 on the first display 56. In another embodiment, the gaming controller 12 displays the game 52 on the first display 56 and/or the second display 58.

In method step 204, the gaming controller 12 randomly generates an outcome of the game 52 and displays the generated game outcome in the game screen 54. In one embodiment, the gaming controller 12 randomly selects a plurality of game symbols 88 from a predefined set of possible game symbols, and displays the selected game symbols 88 associated with the generated game outcome in the game screen 54. In another embodiment, the gaming controller 12 randomly selects a stop position associated with each reel 84, and spins and stops each of the reels 84 based on the corresponding stop position, and determines the game outcome based on the symbols 88 being displayed with the reels in a stopped position.

In the illustrated embodiment, the plurality of game symbols 88 are displayed in a display area 106 that includes a grid 108 having a plurality of cells 110 arranged along a plurality of rows 112 and a plurality of columns 114. Each cell 110 displays one or more game symbols 88 associated with the game outcome. In the illustrated embodiment, the gaming controller 12 displays the game 52 including a plurality of reels 84. Each reel 84 includes a plurality of symbol positions 86 that each displays a game symbol 88. In addition, each reel 84 is displayed in the grid 108 having a height H that is measured along a vertical axis Y, and a width W that is measure along a horizontal axis X. During play of the game 52, the gaming controller 12 displays each reel 84 with a corresponding column 114. In additional, the symbol positions 86 of each reel 84 are displayed within a corresponding cell 110 with the reels 84 in a stopped position. During the bonus feature event 90, the gaming controller 12 may display the replacement reel 92 extending across one or more of the columns 114 and/or display the replacement reel symbol positions 86 across one or more of the cells 110 such that a symbol 88 being displayed within the replacement reel 92 is displayed within adjacent cells 110 and extending across adjacent columns 114 and/or adjacent rows 112.

In the illustrated embodiment, the gaming controller 12 displays the game 52 including 5 reels 84 being displayed in a first reel set 116 and a second reel set 118. The first reel set 116 includes a plurality of first reels 120 such as, for example a $1^{st}$ reel 122, a $2^{nd}$ reel 124, and a $3^{rd}$ reel 126. The second reel set 118 includes a plurality of second reels 128 such as, for example a $4^{th}$ reel 130 and a $5^{th}$ reel 132. In the illustrated embodiment, the gaming controller 12 displays the each first reel 120 with a first number of symbol positions 86 and displays each second reel 128 with a second number of symbol positions 86 that is greater than the first number of symbol positions 86 being displayed with the first reel set 116. For example, during the game 52, the gaming controller 12 displays the reels 84 in a "3-3-3-6-6" arrangement that includes the first reel set 116 being displayed with 3 cells 110 per reel 84 and 3 corresponding symbol positions 86, and the second reel set 118 displayed with 6 cells 110 per reel 84 and 6 corresponding symbol positions 86. In another embodiments, the gaming controller 12 may display 5 reels 84 each with 3 cells 110 per reel 84, respectively (a "5×3" arrangement). In addition, other reel arrangements may be used such as, for example, 3-4-3-4-3, 4-5-5-5-4, or 4-5-4-5-4 arrangements or arrangements with the same number of cells per column, such as 3×3, 3×4, 4×5, or 5×5 configurations. The game 52 may also include a plurality of paylines 134 that extend across one or more cells 110 to indicate, to the player, a combination of game symbols 88.

In the illustrated embodiment, the gaming controller 12 receives a signal, from the user input device 16, that is indicative of a player's selection to initiate a gaming session including a wager amount, and a selection of one or more paylines 134 associated with a predefined set of cells 110 within the display area 106. In the illustrated embodiment, the game 52 is a multi-line game, i.e., the paylines include horizontal paylines and/or diagonal paylines, and/or zig-zag paylines. Moreover, the user input device 16 may allow the player to toggle to increase the bet per payline a credit at a time (up to the maximum bet). The gaming controller 12 randomly generates an outcome of the game 52, and displays the generated outcome on the game screen 54. In one embodiment, the gaming controller 12 is configured to rotate, and/or spin each reel 84 to initiate a game play, and stop each reel 84 to display a plurality of game symbols 88 associated with the randomly generated outcome. In addition, the gaming controller 12 is adapted to determine if the generated outcome is a winning outcome as a function of the displayed game symbols 88, a paytable, a wager, and one or more player selected paylines 134. More specifically, the gaming controller 12 determines if a combination of symbols 88 arranged along the selected payline 134 is a winning combination. The gaming controller 12 may provide an award in response to the outcome of the game 52.

Each game 52 is generally played in a conventional manner. The player makes a wager, which may be based on a predetermined denomination and a selected number of paylines 134, the gaming controller 12 randomly generates an outcome for the game 52, spins the reels 84, and selectively stops the reels 84 to display a game symbol 88 in each of the display cells 110. If a predetermined pattern of game symbols 88 is randomly chosen for each cell 110 on a played payline 134, the player may be awarded a payout based on the payline, the wager, and a predetermined paytable. Moreover, the player may be awarded a payout if the combination of game symbols 88 associated with a selected payline 134 is a winning combination. In addition, a player may receive a bonus feature, bonus games, and/or free games based on the combination of game symbols 88 associated with the selected payline 134 and/or the appearance of one or more special game symbols in the game outcome. Many variations to the above described general play of a slot game fall within the scope of the present invention. Such slot games are well-known in the art, and are therefore not further discussed.

In method step 206, the gaming controller 12 detects the occurrence of a triggering condition during the game 52 and initiates the bonus feature event 90 (shown in FIGS. 5-14) in response to detecting the triggering condition. In the illustrated embodiment, the triggering condition is mystery trigger condition that may be detected after any game outcome. The gaming controller 12 may randomly select a bonus feature number from a predefined range of numbers and, upon receiving a wager from the player, the gaming controller 12 randomly selects a game number and detects the triggering condition if the primary game number matches the bonus feature number.

In the illustrated embodiment, upon detecting the triggering condition, the gaming controller 12 responsively selects one or more reels 84 and replaces the selected reels 84 with a replacement reel 92. In one embodiment, the gaming controller 12 may randomly select one or more reels 84 and/or randomly select one or more reel sets to be replaced by the replacement reel 92. In addition, the gaming controller 12 may detect the appearance of a trigger symbol (not shown) appearing in one or more reels 84 and select the corresponding reel 84 and/or the corresponding reel set 116/118 to be replaced by the replacement reel 92. In one embodiment, the selected reel 84 and/or selected reel set may be a predefined reel 84 and/or a predefined reel set.

In the illustrated embodiment, the replacement reel 92 includes a number of symbol positions 86 that are displayed in the grid 108 that is less than the number of symbol positions 86 being displayed with the selected reels 84. In addition, the selected reels 84 are displayed in the grid 108 having a first height $H_1$ measured along the vertical axis Y. The replacement reel 92 is displayed in the grid 108 having a second height $H_2$ that is approximately equal to the first height $H_1$ of the selected reels 84. For example, in the illustrated embodiment, and as shown in FIGS. 4-7, during the bonus feature event 90, the gaming controller 12 may select the second reel set 118 including the $4^{th}$ reel 130 and the $5^{th}$ reel 132, and replace the second reel set 118 with the replacement reel 92. Moreover, the replacement reel 92 may be displayed with 3 symbol positions 86 that extend across the adjacent columns 114 and the adjacent cells 110 associated with the second reel set 118. In one embodiment, the gaming controller 12 may randomly generate a second outcome of the game 52, spin and stop each of the reels 84 including the replacement reel 92 to display the second outcome, and provide an award to the player as a function of the second outcome. By replacing the second reel set 118 of reels 84 with a replacement reel 92 having fewer symbol positions 86 and/or fewer symbols 88, the probability of achieving a winning outcome is increased during the bonus feature event 90.

Figure 8:
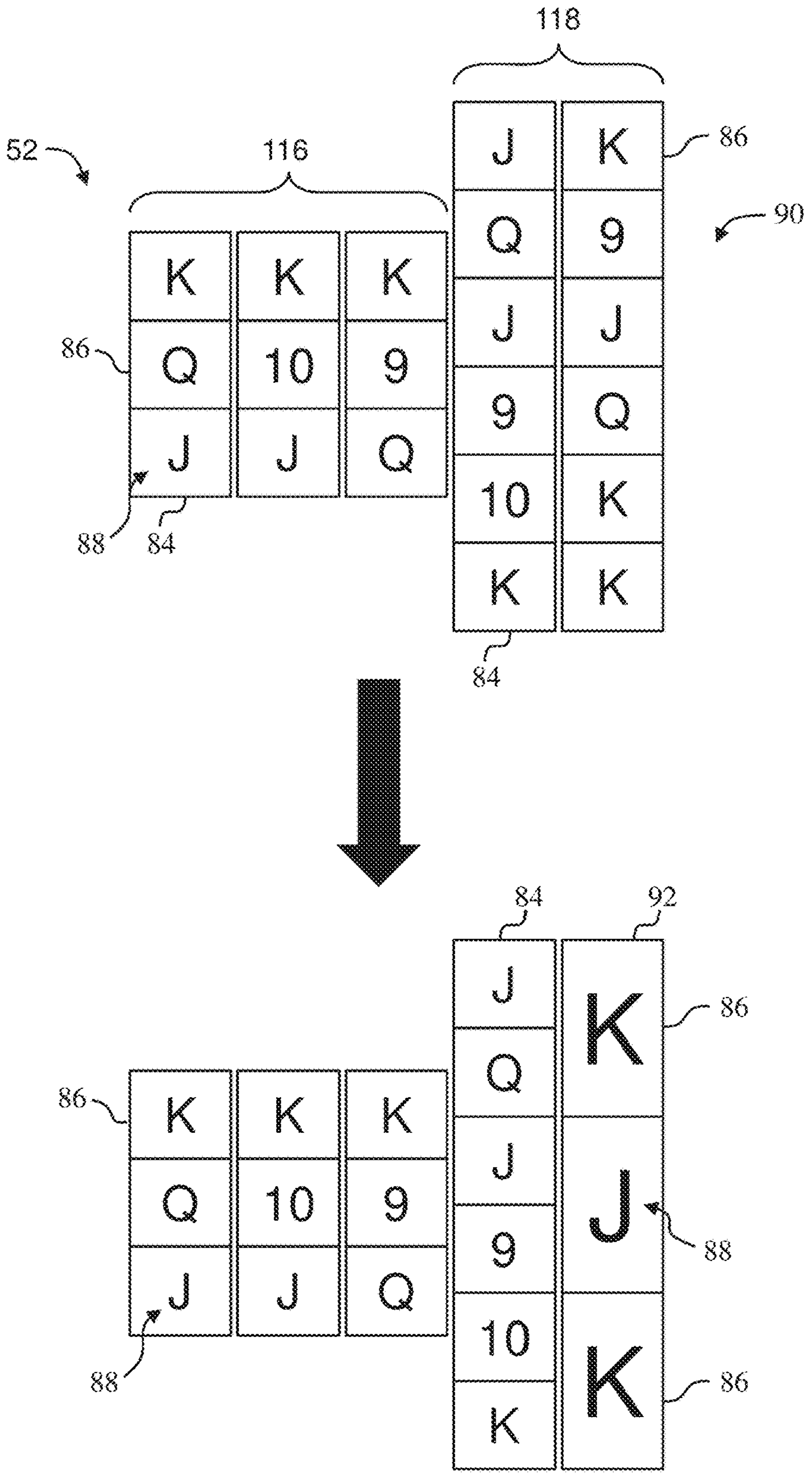

In one embodiment, referring to FIG. 8, the gaming controller 12 may randomly select a single reel 84 such as, for example, the $5^{th}$ reel 132, and replace the $5^{th}$ reel 132 with a replacement reel 92 that is associated with a single column 114 and has 3 symbol positions that extend across the adjacent cells 110 associated with the $5^{th}$ reel 132.

Figure 9:
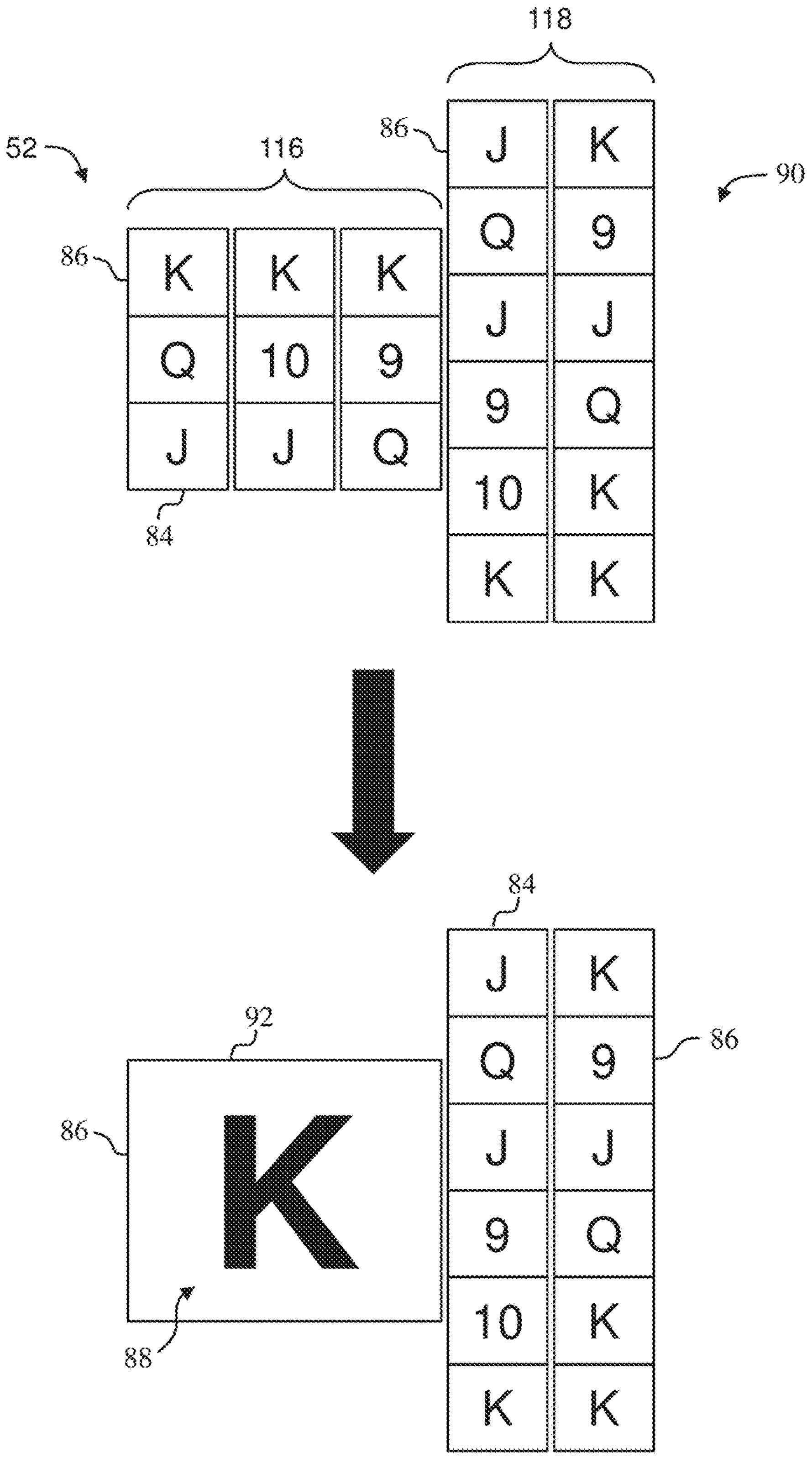

In another embodiment, as shown in FIG. 9, the gaming controller 12 may select the first reel set 116 including the $1^{st}$ $2^{nd}$, and $3^{rd}$ reels 122, 124, and 126, and replace the first reel set 116 with the replacement reel 92. In addition, the replacement reel 92 may be displayed across each corresponding column 114 of the selected reel set and include a symbol position 86 that extends across each corresponding cell 110 associated with the selected reel set. For example, as shown in FIG. 9, the gaming controller 12 may replace the first reel set 116 with a replacement reel 92 that includes a corresponding symbol position 86 that extends across each correspond cell 110 associated with the first reel set 116. In the illustrated embodiment, the replacement reel 92 is displayed with a single symbol position 86 in a stopped position that extends across each of the columns and each cell displayed with the first reel set 116, such that a single symbol 88 is displayed in place of the first reel set 116 in the outcome of the bonus feature event 90.

Figure 10:
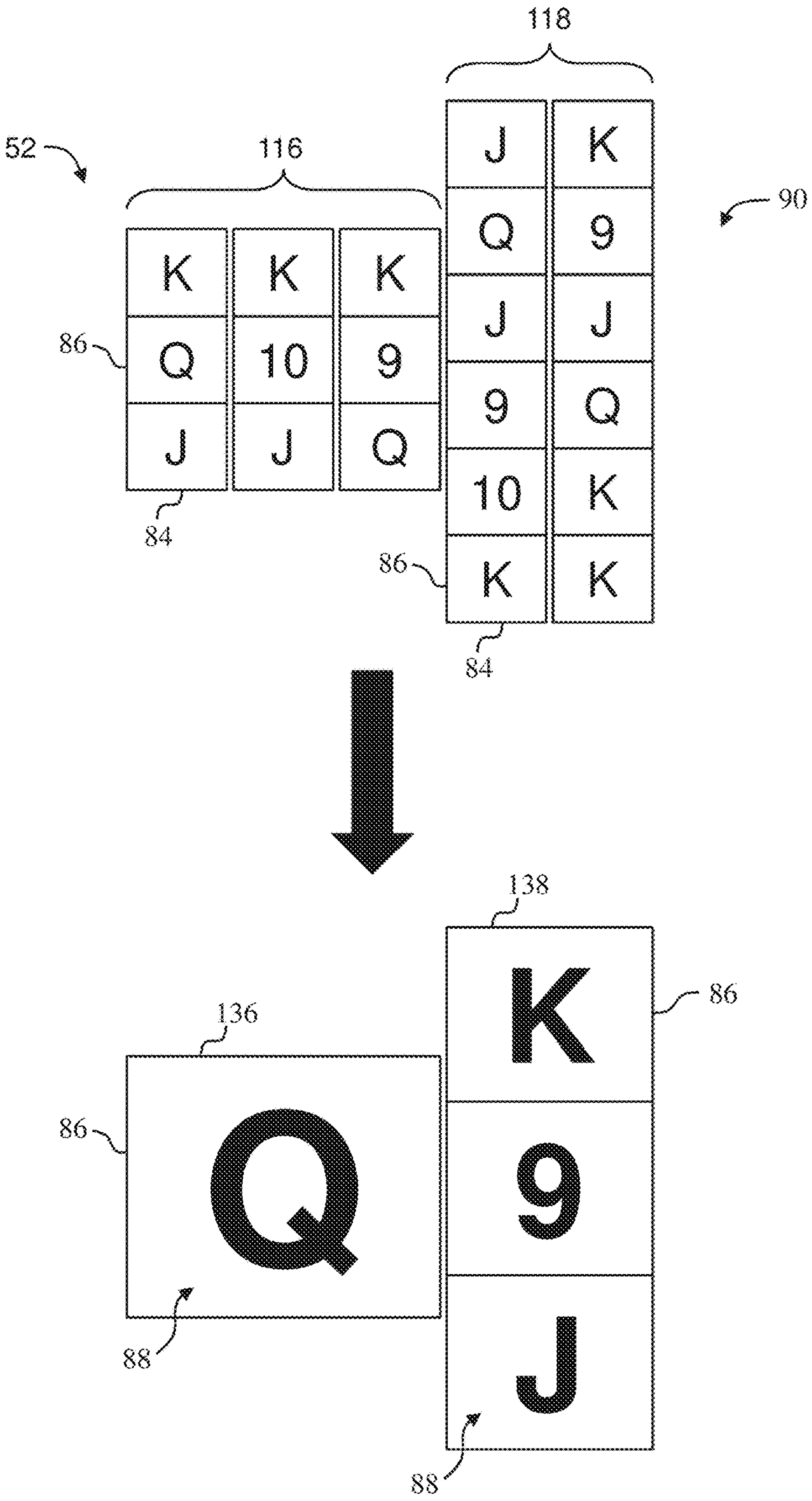

Referring to FIG. 10, in one embodiment, the gaming controller 12 may replace the first reel set 116 with a first replacement reel 136 and replace the second reel set 118 with a second replacement reel 138. Moreover, the second replacement reel 138 includes a number of symbol position 86 that is greater than the number of symbol positions 86 of the first replacement reel 136. In addition, the second replacement reel 138 includes a number of symbol positions 86 that is equal to the number of symbol positions 86 displayed with the first reel set 116. For example, as shown in FIG. 10, during the bonus feature event 90, the gaming controller 12 may replace the first reel set 116 being displayed with 3 symbol positions 86 per reel 84 with the first replacement reel 136 including 1 symbol position 86 displayed in the grid 108, and replace the second reel set 118 being displayed with 6 symbol positions 86 per reel 84 with the second replacement reel 138 that is displayed with 3 symbol positions 86 in the grid 108.

In method step 208, the gaming controller 12 selects another reel 84 from the plurality of reels 84 and synchronizes the display of the replacement reel 92 with the selected reel 84 such that the replacement reel 92 and the selected reel 84 each display the same symbols 88 in the same order in corresponding symbol position 86. Moreover, in one embodiment, the gaming controller 12 displays the replacement reel 92 including a number of symbol positions 86 being displayed in the grid 108 that is equal to the number of symbols positions included with the selected reel 84. In addition, the gaming controller 12 may synchronize a rotation of the replacement reel 92 and the selected reel 84 to display the same symbols 88 (illustrated by the symbol order "K-Q-J") in the same symbol positions 86 while the replacement reel 92 and the selected reel 84 are spinning. For example, referring to FIGS. 5 and 7, in the illustrated embodiment, the gaming controller 12 may select the $1^{st}$ reel 122 being displayed with 3 symbol positions 86, display the replacement reel 92 having 3 symbol positions 86, and synchronize the display the $1^{st}$ reel 122 and the replacement reel 92 such that the $1^{st}$ reel 122 and the replacement reel 92 are in a mirrored relationship to display the same type of symbols 88 in the same order in the grid 108. In one embodiment, the gaming controller 12 may synchronize the symbols of the $1^{st}$ reel 122 and the replacement reel 92 during the reel spin. In another embodiment, the gaming controller 12 may synchronize the display of symbols when the reels stop, or before the reels are spun during the bonus feature event 90.

Figure 11:
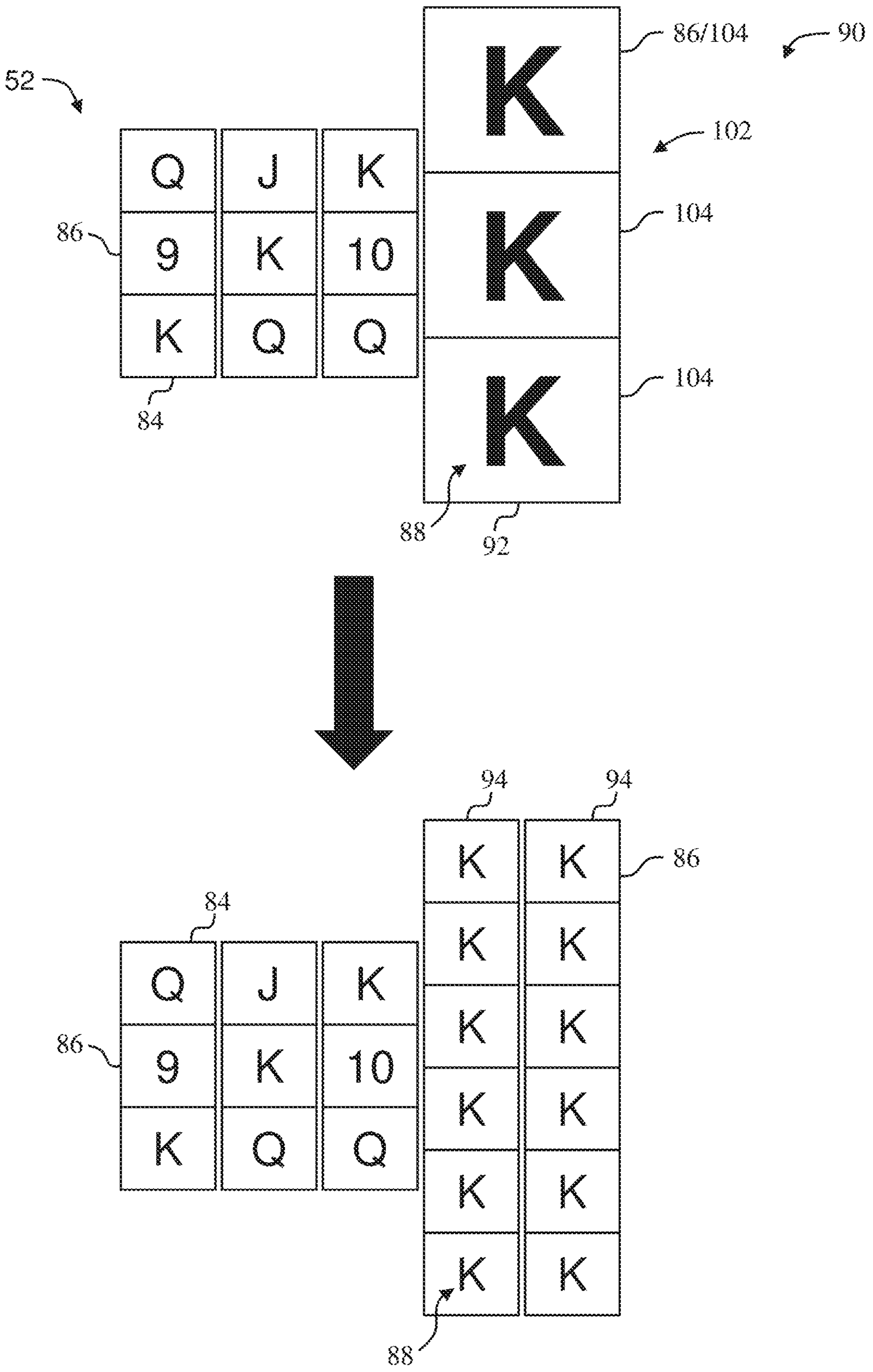

In one embodiment, as shown in FIG. 11, the gaming controller 12 may display the replacement reel 92 with one or more runs of consecutive special symbol positions 104, randomly select a game symbol 88, and display the game symbol 88 in each of the consecutive special symbol positions 104. In addition, the gaming controller 12 may populate the consecutive special symbol positions 104 with the selected game symbol 88 before, during, or after the replacement reel 92 begins to spin. Moreover, the gaming controller 12 may populate the consecutive special symbol positions 104 with the selected game symbol 88 after the replacement reel 92 is stopped.

In method step 210, the gaming controller 12 randomly generates an outcome of the bonus feature event 90, spins and stops the reels 84 including the replacement reel 92, and splits the replacement reel 92 into a plurality of secondary replacement reels 94 to display the generated outcome. Each of the secondary replacement reels 94 includes a number of symbol positions 86 that is greater than the number of symbol positions 86 displayed with the replacement reel 92. In addition, each secondary replacement reel 94 is displayed with a third height $H_3$ measured along vertical axis Y that is approximately equal to the height $H_2$ of the replacement reel 92. For example, referring to FIGS. 11 and 12, in the illustrated embodiment, the gaming controller 12 splits the replacement reel 92 into a plurality of secondary replacement reels 94 such that the symbols 88 displayed in the replacement reel 92 are also displayed in each of the secondary replacement reels 94. For example, in the illustrated embodiment, the gaming controller 12 displays each secondary replacement reel 94 with a group 96 of symbol positions 86 that correspond to each of the symbol positions 86 displayed with the replacement reel 92. In addition, each symbol position 86 in the group 96 is displayed with the same symbol 88 displayed in the corresponding symbol position 86 of the replacement reel 92. In the illustrated embodiment, the gaming controller 12 determines the symbols 88 being displayed in each of the symbol positions 86 of the replacement reel 92 in a first outcome of the bonus feature event 90, splits the replacement reel 92 into the secondary replacement reels 94, and displays the replacement reel symbol 88 in each of the groups 96 of symbol positions 86 displayed with the secondary replacement reels 94 to display a second outcome. In one embodiment, gaming controller 12 splits the replacement reel 92 after the replacement reel 92 has stopped. In another embodiment, the gaming controller 12 may split the replacement reel 92 into the secondary replacement reels 94 as the replacement reel 92 is spinning.

Figure 12:
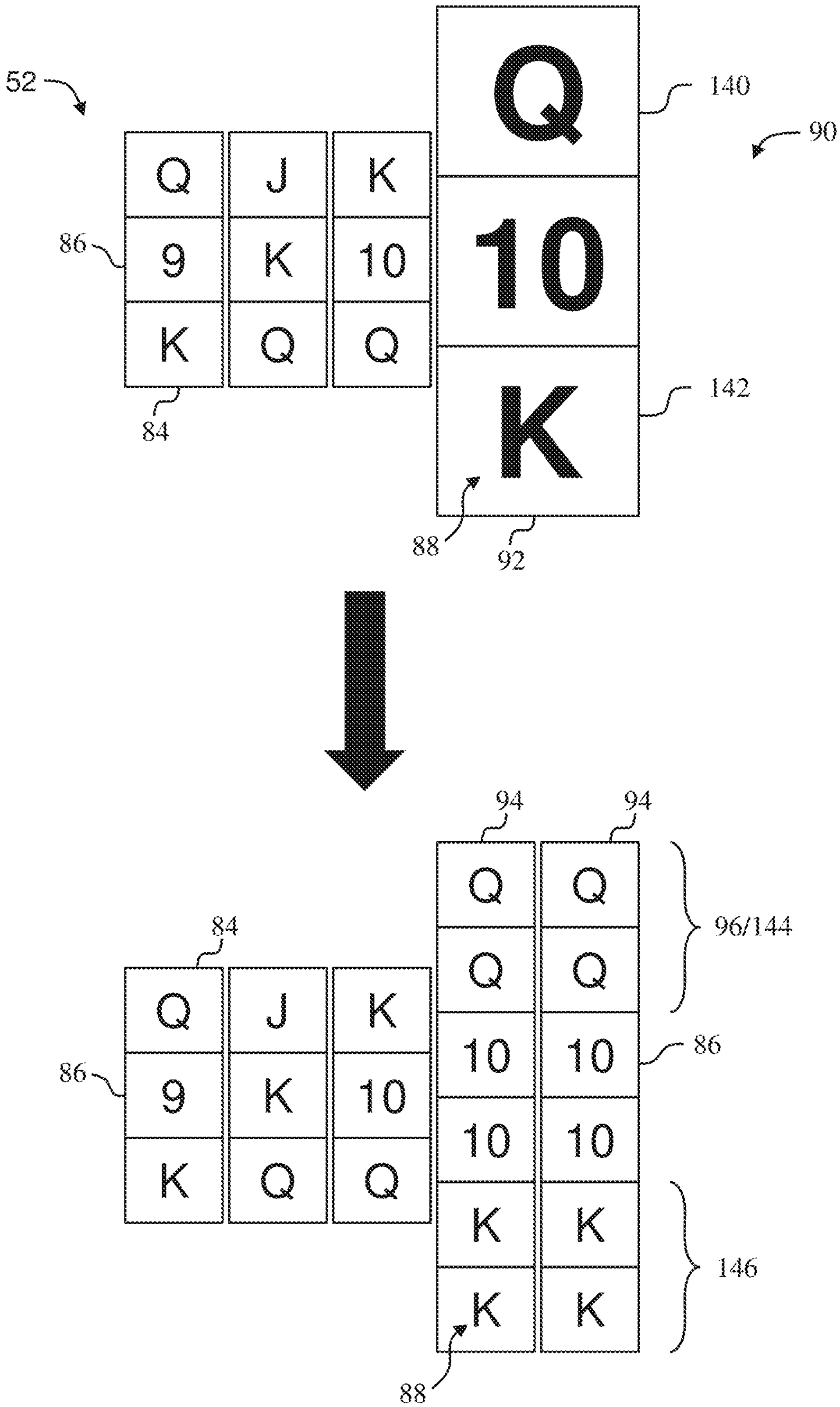

In one embodiment, as shown in FIG. 12, the replacement reel 92 may include a first symbol position 140 and a second symbol position 142 displayed in the grid 108. Moreover, each secondary replacement reel 94 includes a plurality of groups 96 of symbol positions 86 such as for example a first group 144 and a second group 146. The first group 144 is associated with the first symbol position 140 and the second group 146 is associated with the second symbol position 142 such that each symbol position 86 in the first group 144 displays a similar symbol 88 being displayed in the first symbol position 140 and each symbol position of the second group 146 displays a similar symbol 88 displayed in the second symbol position 142.

Figure 13:
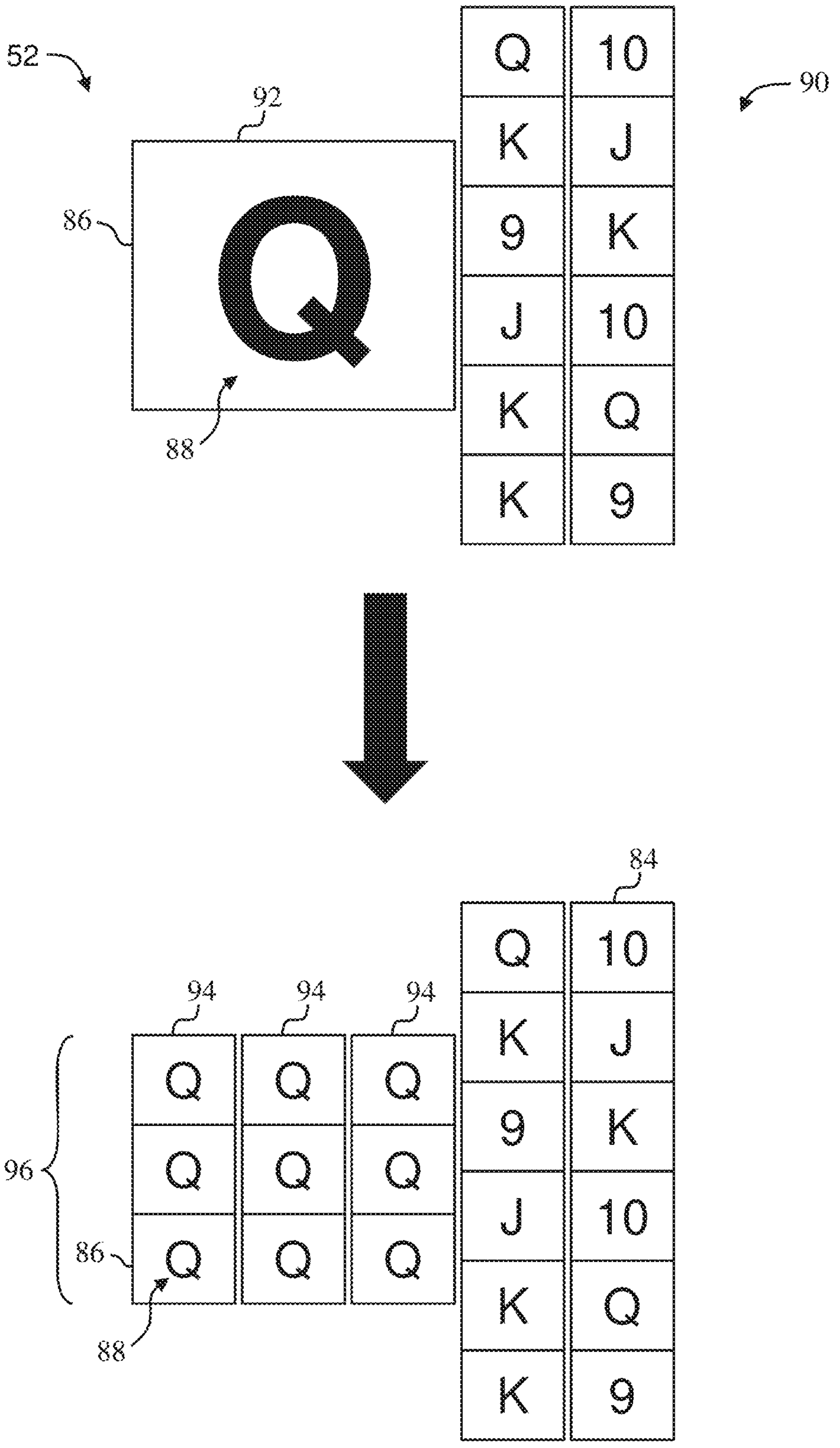

Referring to FIG. 13, in one embodiment, the replacement reel 92 may be split into a plurality of secondary replacement reels 94 that display the same symbol in each corresponding symbol position 86.

Figure 14:
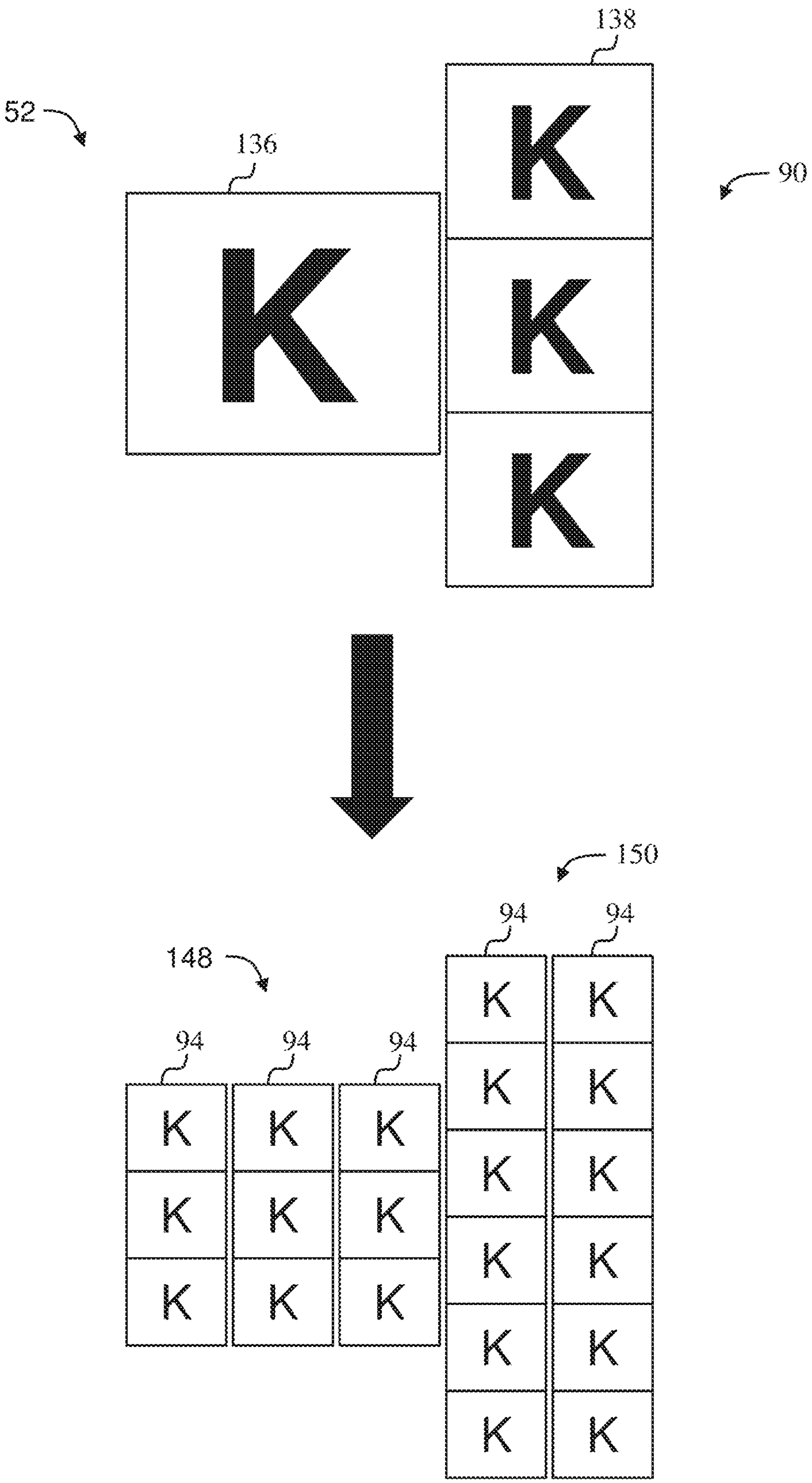

In another embodiment, shown in FIG. 14, the gaming controller 12 may split the first replacement reel 136 into a first set 148 of secondary replacement reels 94 and split the second replacement reel 138 into a second set 150 of secondary replacement reels 94. Each set of secondary replacement reels 94 displaying the same symbols 88 being displayed in the corresponding replacement reels 136 and 138, respectively.

In method step 212, the gaming controller 12 evaluates the symbols 88 being displayed with the outcome of bonus feature event 90 and provides an award to the player as a function of the displayed symbols 88. In one embodiment, the gaming controller 12 determines a winning outcome as a function of the combination of symbols 88 defined along an associated payline 134. In another embodiment, the gaming controller 12 evaluates each symbol combination including each symbol displayed in an adjacent reel 84 from left-to-right, to determine winning outcomes.

Figure 15:
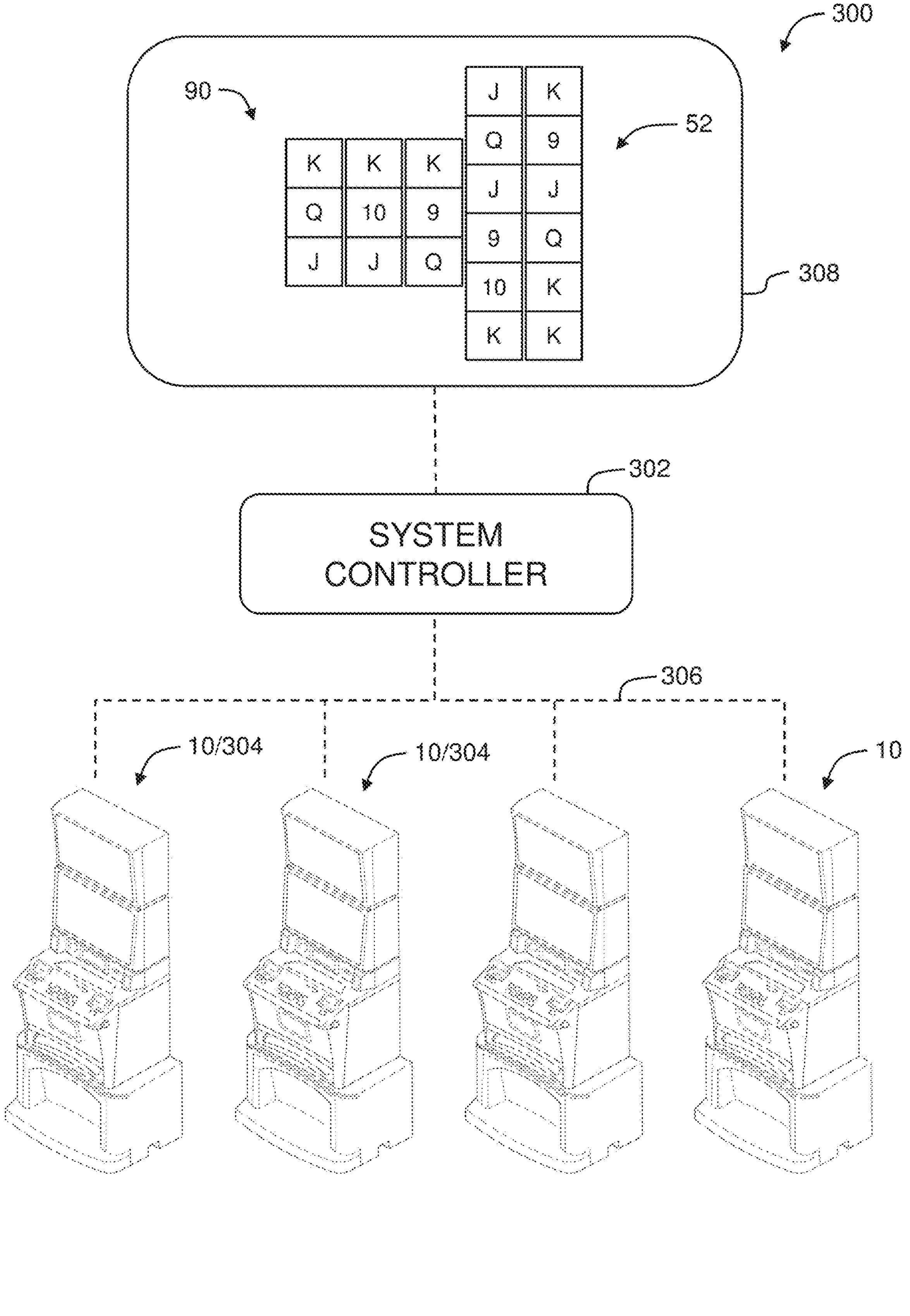
FIG. 15 is a schematic view of a gaming system that may be used for providing an award to a player, according to an embodiment of the present invention.

FIG. 15 is a schematic view of an exemplary gaming system 300. The gaming system 300 includes a system controller 302 and one or more gaming devices 10 that are coupled to the system controller 302. In one embodiment, the gaming devices 10 include a gaming machine 304 located in a casino. In another embodiment, the gaming devices 10 may include a personal computer, laptop, cell phone, smartphone, tablet computer, personal data assistant, and/or any suitable computing device that enables a player to connect to system controller 302 via the internet.

In the illustrated embodiment, the system controller 302 is configured to perform all of the functions of the gaming controller 16 as described herein. The system controller 302 communicates with each gaming device 10 for playing a game 52 and/or the bonus feature event 90 on each gaming device 10 based on user selection input received from each gaming device 10. In the illustrated embodiment, the system controller 302 plays a separate instance of the games on each gaming device 10 such that each player associated with the gaming devices 10 may play a separate instance of the games simultaneously.

In one embodiment, the system 300 includes a plurality of gaming machines 304 located in a casino. The gaming machines 304 and the system controller 302 are coupled in communication with a local area network (LAN) 306. Alternatively, the gaming machines 304 and the system controller 302 may be coupled via a network such as, for example, an Internet link, an intranet, a WAN, dial-in-connections, cable modems, wireless modems, and/or ISDN lines. In the illustrated embodiment, the gaming system 300 includes four gaming machines 304, which in one embodiment as shown in FIG. 15 are arranged in a bank, i.e., are arranged together, adjacently. It should be noted, however, that the gaming system 300 may include any number of gaming machines 304 that may be arranged in any manner, such as in a circle or along a curved arc, or positioned within separate areas of a casino floor, and/or separate gaming establishments such as different casinos. Furthermore, additional groups of gaming machines 304 may be coupled to the system controller 302. In addition, in the illustrated embodiment, the gaming system 300 may also include a central display 308 that is coupled to the system controller 302 for displaying games played on one or more of the gaming machines 304.

In one embodiment, the system controller 302 may be implemented by one of the gaming controllers 12 associated with a gaming machine 304. In still another embodiment, the system controller 302 may be located remotely with respect to gaming machines 304, or within one of the gaming machine cabinet assemblies (shown in FIG. 1).

In the illustrated embodiment, the system controller 302 may be configured to play separate instances of the primary game 52 on each of the gaming machine 304. In addition, the system controller 302 may determine if a triggering condition occurs in a game outcome being played at one or more of the gaming machines 304, and display the bonus feature event 90 on the central display 308 if a triggering event occurs. Alternatively, the system controller 302 may display the bonus feature event 90 at one or more gaming machines 304 based on one or more triggering events occurring in games played at the gaming machines 304.

The above-described systems and methods overcome at least some disadvantages of known gaming machines by providing a gaming device that displays a game including a bonus feature event that includes a replacement reel. More specifically, the gaming device displays a game including a plurality of reels, detects a triggering condition in a game outcome, and replaces one or more of the reels with the replacement reel that displays fewer symbols than the selected reels, and provides an award based on an outcome that includes the replacement reel. By providing a replacement reel that displays fewer game symbols, the probability of achieving a winning outcome is increased, the player's expectation for achieving a win is increased, and the enjoyment of the game is improved. Thus, the amount of time that the game is played by patrons of a gaming establishment is thereby increased.

Exemplary embodiments of a gaming machine, a gaming system, and a method of allowing a player to play a gaming machine are described above in detail. The gaming machine, system, and method are not limited to the specific embodiments described herein, but rather, components of the gaming machine and/or system and/or steps of the method may be utilized independently and separately from other components and/or steps described herein. For example, the gaming machine may also be used in combination with other gaming systems and methods, and is not limited to practice with only the gaming machine as described herein. Rather, an exemplary embodiment can be implemented and utilized in connection with many other gaming system applications.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A gaming machine, comprising:

a gaming cabinet;

a display device mounted to the gaming cabinet and including a display screen displaying computer-generated images;

a user input device mounted to the gaming cabinet and configured to generate a signal indicative of a player's selection input; and a controller including one or more processors coupled to the display device and the user input device, the one or more processors programmed to execute an algorithm to display an animated sequence of computer-generated images on the display device including the steps of:

rendering five reels within five columns on the display screen of the display device with each of the five reels including a plurality of symbol positions displayed with a corresponding symbol;

transforming a first set of adjacent reels of the five reels into a first single replacement reel having fewer symbol positions than the first set of adjacent reels and displaying oversized symbols extending across each column associated with the first set of adjacent reels;

transforming a second set of adjacent reels of the five reels into a second single replacement reel having fewer symbol positions than the second set of adjacent reels and displaying oversized symbols extending across each column associated with the second set of adjacent reels; and animating the reels including the first and second replacement reels to spin and stop to display an outcome of a game.

2. The gaming machine of claim 1, wherein the one or more processors is programmed to execute the algorithm including the steps of:

displaying the first single replacement reel with a first reel height greater than the second single replacement reel.

3. The gaming machine of claim 1, wherein the one or more processors is programmed to execute the algorithm including the steps of:

transforming the second set of adjacent reels including a greater number of adjacent reels than the first set of adjacent reels.

4. The gaming machine of claim 1, wherein the one or more processors is programmed to execute the algorithm including the steps of:

transforming the first set of adjacent reels including two adjacent reels of the five reels into the first single replacement reel.

5. The gaming machine of claim 4, wherein the one or more processors is programmed to execute the algorithm including the steps of:

transforming the second set of adjacent reels including three adjacent reels of the five reels into the second single replacement reel.

6. The gaming machine of claim 1, wherein the one or more processors is programmed to execute the algorithm including the steps of:

animating the reels to stop with the first single replacement reel displaying three oversized symbols.

7. The gaming machine of claim 6, wherein the one or more processors is programmed to execute the algorithm including the steps of:

animating the reels to stop with the second single replacement reel displaying one oversized symbol.

8. A method of operating a gaming machine including a gaming cabinet, a display device mounted to the gaming cabinet and including a display screen displaying computer-generated images, a user input device mounted to the gaming cabinet and configured to generate a signal indicative of a player's selection input, and a controller including one or more processors coupled to the display device and the user input device, the method including the one or more processors performing an algorithm to display an animated sequence of computer-generated images on the display device including the steps of:

rendering five reels within five columns on the display screen of the display device with each of the five reels including a plurality of symbol positions displayed with a corresponding symbol;

transforming a first set of adjacent reels of the five reels into a first single replacement reel having fewer symbol positions than the first set of adjacent reels and displaying oversized symbols extending across each column associated with the first set of adjacent reels;

transforming a second set of adjacent reels of the five reels into a second single replacement reel having fewer symbol positions than the second set of adjacent reels and displaying oversized symbols extending across each column associated with the second set of adjacent reels; and animating the reels including the first and second replacement reels to spin and stop to display an outcome of a game.

9. The method of claim 8, including the one or more processors performing the algorithm including the steps of:

displaying the first single replacement reel with a first reel height greater than the second single replacement reel.

10. The method of claim 8, including the one or more processors performing the algorithm including the steps of:

transforming the second set of adjacent reels including a greater number of adjacent reels than the first set of adjacent reels.

11. The method of claim 8, including the one or more processors performing the algorithm including the steps of:

transforming the first set of adjacent reels including two adjacent reels of the five reels into the first single replacement reel.

12. The method of claim 11, including the one or more processors performing the algorithm including the steps of:

transforming the second set of adjacent reels including three adjacent reels of the five reels into the second single replacement reel.

13. The method of claim 8, including the one or more processors performing the algorithm including the steps of:

animating the reels to stop with the first single replacement reel displaying three oversized symbols.

14. The method of claim 13, including the one or more processors performing the algorithm including the steps of:

animating the reels to stop with the second single replacement reel displaying one oversized symbol.

15. A non-transitory computer-readable storage media having computer-executable instructions embodied thereon for operating a gaming machine including a gaming cabinet, a display device mounted to the gaming cabinet and including a display screen displaying computer-generated images, a user input device mounted to the gaming cabinet and configured to generate a signal indicative of a player's selection input, and a controller including one or more processors coupled to the display device and the user input device, when executed by one or more processors the computer-executable instructions cause the one or more processors to perform an algorithm to display an animated sequence of computer-generated images on the display device including the steps of:

rendering five reels within five columns on the display screen of the display device with each of the five reels including a plurality of symbol positions displayed with a corresponding symbol;

transforming a first set of adjacent reels of the five reels into a first single replacement reel having fewer symbol positions than the first set of adjacent reels and displaying oversized symbols extending across each column associated with the first set of adjacent reels;

transforming a second set of adjacent reels of the five reels into a second single replacement reel having fewer symbol positions than the second set of adjacent reels and displaying oversized symbols extending across each column associated with the second set of adjacent reels; and animating the reels including the first and second replacement reels to spin and stop to display an outcome of a game.

16. The non-transitory computer-readable storage media of claim 15, wherein the computer-executable instructions cause the one or more processors to perform the algorithm including the steps of:

displaying the first single replacement reel with a first reel height greater than the second single replacement reel.

17. The non-transitory computer-readable storage media of claim 15, wherein the computer-executable instructions cause the one or more processors to perform the algorithm including the steps of:

transforming the second set of adjacent reels including a greater number of adjacent reels than the first set of adjacent reels.

18. The non-transitory computer-readable storage media of claim 15, wherein the computer-executable instructions cause the one or more processors to perform the algorithm including the steps of:

transforming the first set of adjacent reels including two adjacent reels of the five reels into the first single replacement reel.

19. The non-transitory computer-readable storage media of claim 18, wherein the computer-executable instructions cause the one or more processors to perform the algorithm including the steps of:

transforming the second set of adjacent reels including three adjacent reels of the five reels into the second single replacement reel.

20. The non-transitory computer-readable storage media of claim 15, wherein the computer-executable instructions cause the one or more processors to perform the algorithm including the steps of:

animating the reels to stop with the first single replacement reel displaying three oversized symbols and the second single replacement reel displaying one oversized symbol.

* * * * *